US 12,055,503 B2

(12) United States Patent
Aoki et al.

(10) Patent No.: US 12,055,503 B2
(45) Date of Patent: Aug. 6, 2024

(54) NON-TRANSITORY COMPUTER-READABLE RECORDING MEDIUM AND THERMAL ANALYSIS DEVICE

(71) Applicant: KOA Corporation, Ina (JP)

(72) Inventors: Hirotoshi Aoki, Ina (JP); Koichi Hirasawa, Ina (JP)

(73) Assignee: KOA Corporation, Nagano (JP)

( * ) Notice: Subject to any disclaimer, the term of this patent is extended or adjusted under 35 U.S.C. 154(b) by 996 days.

(21) Appl. No.: 16/980,164

(22) PCT Filed: Jan. 18, 2019

(86) PCT No.: PCT/JP2019/001564
§ 371 (c)(1),
(2) Date: Sep. 11, 2020

(87) PCT Pub. No.: WO2019/176282
PCT Pub. Date: Sep. 19, 2019

(65) Prior Publication Data
US 2021/0262959 A1 Aug. 26, 2021

(30) Foreign Application Priority Data
Mar. 15, 2018 (JP) .................................. 2018-047791

(51) Int. Cl.
G01N 25/18 (2006.01)
G01K 7/42 (2006.01)
(Continued)

(52) U.S. Cl.
CPC ............ *G01N 25/18* (2013.01); *G01K 7/427* (2013.01); *G01N 27/18* (2013.01); *G06F 30/20* (2020.01);
(Continued)

(58) Field of Classification Search
CPC ........ G01N 25/18; G01N 27/18; G01K 7/427; G06F 30/20; G06F 30/367;
(Continued)

(56) References Cited

U.S. PATENT DOCUMENTS

2010/0023903 A1* 1/2010 Pramono ............... G06F 30/367
716/106
2014/0089876 A1* 3/2014 Fu ......................... G06F 30/367
716/112
(Continued)

FOREIGN PATENT DOCUMENTS

JP 2016206114 A * 12/2016

OTHER PUBLICATIONS

Lasance, Clemens JM. "Ten years of boundary-condition-independent compact thermal modeling of electronic parts: A review." Heat Transfer Engineering 29.2 (2008): 149-168. (Year: 2008).*

(Continued)

Primary Examiner — Yoshihisa Ishizuka
Assistant Examiner — Carter W Ferrell
(74) Attorney, Agent, or Firm — Honigman LLP

(57) ABSTRACT

A thermal analysis model includes an intermediate node that imitates an intermediate portion and a first thermal resistance connecting to the intermediate node, and imitates the terminal portions on both sides. A terminal portion inside node connected to the first thermal resistance is configured to imitate an inside area adjacent to the intermediate portion and serves as a starting point of a first heat dissipation path to the substrate. A terminal outside node is configured to imitate an outside area separated from the intermediate portion and adjacent to the inside area in the terminal portions and serves as a starting point of a second heat dissipation path to the substrate. A second thermal resistance connects the terminal portion inside node and the terminal (Continued)

portion outside node and is arranged parallel to a different element imitating a thermal resistance of an electrode layer in a surface of the substrate.

15 Claims, 16 Drawing Sheets

(51) Int. Cl.
    *G01N 27/18*      (2006.01)
    *G06F 30/20*      (2020.01)
    *G06F 30/367*      (2020.01)
    *G06F 119/08*      (2020.01)

(52) U.S. Cl.
    CPC ........ *G06F 30/367* (2020.01); *G06F 2119/08* (2020.01)

(58) Field of Classification Search
    CPC .... G06F 2119/08; G06F 30/392; G06F 30/00; G06F 30/23; G06F 2119/06; G06F 30/398; G06F 25/18; G06F 2111/10; G06F 30/39; G06F 2113/18
    See application file for complete search history.

(56) References Cited

U.S. PATENT DOCUMENTS

| | | | |
|---|---|---|---|
| 2016/0048622 A1* | 2/2016 | Jeon | G06F 30/367 703/14 |
| 2017/0235861 A1* | 8/2017 | Matsushita | G06F 30/20 703/1 |
| 2018/0075176 A1* | 3/2018 | Yasutake | G06F 30/00 |
| 2019/0238139 A1* | 8/2019 | Haneda | H03H 9/1021 |

OTHER PUBLICATIONS

International Search Report, Application No. PCT/JP2019/001564, mailed Mar. 19, 2019. ISA/Japan Patent Office.

\* cited by examiner

FIG.8

| TERMINAL PORTION | THERMAL RESISTANCE NAME | START NODE | END NODE | THERMAL RESISTANCE VALUE (°C/W) |
|---|---|---|---|---|
| ONE | Rhs | Nhs | Nti | XX |
| | Rm | Nti | Nto | X |
| | r3 | Nhs | Ns3 | 0.1 |
| | r13 | Nhs | Ns13 | 0.1 |
| | r1 | Nti | Ns1 | 0.1 |
| | r11 | Nti | Ns11 | 0.1 |
| | r2 | Nto | Ns2 | 0.1 |
| | r12 | Nto | Ns12 | 0.1 |
| OTHER | Rhs | Nhs | Nti | XX |
| | Rm | Nti | Nto | X |
| | r3 | Nhs | Ns3 | 0.1 |
| | r13 | Nhs | Ns13 | 0.1 |
| | r1 | Nti | Ns1 | 0.1 |
| | r11 | Nti | Ns11 | 0.1 |
| | r2 | Nto | Ns2 | 0.1 |
| | r12 | Nto | Ns12 | 0.1 |

NON-TRANSITORY COMPUTER-READABLE RECORDING MEDIUM AND THERMAL ANALYSIS DEVICE

CROSS-REFERENCE TO RELATED APPLICATIONS

This application is the U.S. national stage of PCT/JP2019/001564 filed on Jan. 18, 2019, which claims priority of Japanese Patent Application No. JP 2018-047791 filed on Mar. 15, 2018, the contents of which are incorporated herein.

TECHNICAL FIELD

The present disclosure relates to a non-transitory computer-readable recording medium and thermal analysis device.

BACKGROUND

JP2016-218605A discloses a thermal analysis model that divides a semiconductor integrated circuit to upper and lower areas in a vertical direction with respect to a substrate from a portion serving as a heat source of a semiconductor chip, and representing the upper area and the lower area by two thermal resistances.

SUMMARY

When the thermal analysis model described above is applied to thermal analysis of a resistor different in structure and physical properties from a semiconductor integrated circuit, transfer of heat in the vertical direction with respect to the substrate in an intermediate portion serving as the heat source of the resistor is imitated by the two thermal resistances. However, although how the heat transfers change depending on the difference in resistors, this point is not taken into consideration in the model described above; it was hence difficult to analyze the temperature of the resistor with good accuracy.

An object of the present disclosure is to provide a thermal analysis model and a thermal analysis device that perform thermal analysis of a resistor with a simple configuration, and a thermal analysis program and a model generation program.

According to an aspect of the present disclosure, a thermal analysis model of a resistor analyzes a temperature of a resistor including an intermediate portion separated from a substrate and terminal portions connecting to the substrate on both sides of the intermediate portion. This thermal analysis model includes an intermediate node configured to imitate the intermediate portion and a first thermal resistance connecting to the intermediate node, and imitates at least one of the terminal portions on both sides. This thermal analysis model includes a terminal portion inside node connecting to the first thermal resistance. The terminal portion inside node is configured to imitate an inside area adjacent to the intermediate portion in the one of the terminal portions and serve as a starting point of a first heat dissipation path from the at least one of the terminal portions to the substrate. Furthermore, the thermal analysis model includes a terminal portion outside node configured to imitate an outside area separated from the intermediate portion and adjacent to the inside area in the one of the terminal portions. The terminal portion outside node is configured to serve as a starting point of a second heat dissipation path from the one of the terminal portions to the substrate. Moreover, the thermal analysis model includes a second thermal resistance connecting the terminal portion inside node and the terminal portion outside node and arranged parallel to a different element configured to imitate a thermal resistance of an electrode layer in a surface of the substrate.

Although the heat transfer from the terminal portions of the resistor to the substrate differs depending on the difference in thermal resistance of the substrate, in particular the thermal resistance of the electrode layer in the surface of the substrate, according to this aspect, this effect can be imitated by arranging the second thermal resistance parallel to the thermal resistance on the surface of the substrate in the thermal analysis model. Hence, it is possible to perform the thermal analysis of a resistor upon taking in consideration of the effect by the substrate with a simple configuration.

BRIEF DESCRIPTION OF DRAWINGS

FIG. 8 is a view showing a setting example of a node configuring the thermal analysis model of a resistor.

DESCRIPTION OF EMBODIMENTS

Embodiments of the present disclosure will be described below, with reference to the accompanied drawings.

First Embodiment

Figure 1:
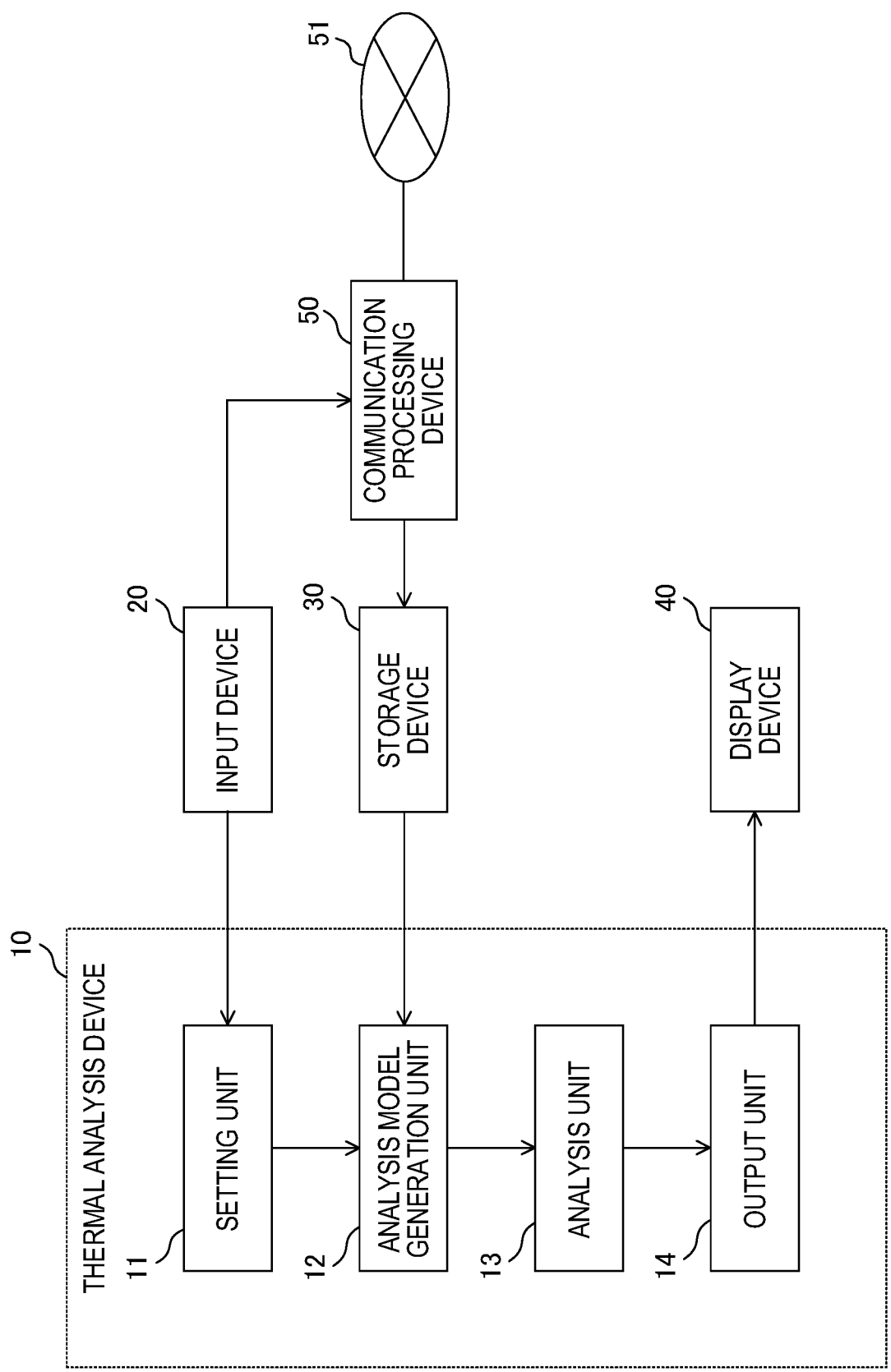
FIG. 1 is a block diagram showing a configuration of a thermal analysis device that analyzes a temperature of a resistor in a first embodiment of the present disclosure.

FIG. 1 is a block diagram showing a configuration example of a thermal analysis device 10 of a resistor in the first embodiment.

The thermal analysis device 10 is a computer that analyzes temperature distribution of electronic components mounted on a substrate, and in particular, analyzes temperatures of a resistor. The thermal analysis device 10 is configured of a processor, a ROM (Read Only Memory), a RAM (Random Access Memory), an input/output interface, a bus for interconnecting these components and the like.

The processor configuring the thermal analysis device 10 is, for example, a CPU (Central Processing Unit), an MPU (Micro Processing Unit), a DSP (digital signal processor) or the like. The input/output interface of the thermal analysis device 10 is connected with an input device 20, a storage device 30, and a display device 40.

The input device 20 includes a mouse, keyboard, touch panel and the like. The storage device 30 includes an HDD (hard disk drive), SSD (Solid State Drive), optical drive or the like.

The storage device 30 stores a thermal analysis program for executing thermal fluid analysis of electronic components mounted on the substrate. Furthermore, the storage device 30 stores thermal network data regarding the resistor to be analyzed among the electronic components mounted on the substrate. This thermal network data of the resistor is a program for generating an analysis model of an electronic circuit necessary in executing the thermal analysis program.

The display device 40 includes a liquid crystal display, projector or the like. A communication processing device 50 communicates with an external terminal, and records data received from the external terminal in the storage device 30. For example, the communication processing device 50 receives various programs such as the thermal analysis program and the thermal network data described above, from an external server or the like via a network 51 such as the Internet and telecommunication network, on the basis of input information from the input device 20.

The communication processing device 50 records the received various programs in the storage device 30. The communication processing device 50 may also receive various programs to be executed by the thermal analysis device 10 from a USB (universal serial bus) memory, CD-ROM (Compact Disc Read only memory) or the like.

Next describes a functional configuration of the thermal analysis device 10 in detail.

The thermal analysis device 10 includes a setting unit 11, an analysis model generation unit 12, an analysis unit 13, and an output unit 14. Functions of each unit in the thermal analysis device 10 are implemented by the processor executing the thermal analysis program read into the RAM.

The setting unit 11 sets analysis conditions for executing the thermal analysis of the electronic components mounted on the substrate. For example, the setting unit 11 sets, as the analysis conditions, dimensions and physical property values of the substrate and electronic components, and an applied power (supplied power) applied on the electronic components, on the basis of input information from the input device 20.

The analysis model generation unit 12 configures a preparation unit that prepares the thermal analysis model of the resistor. The analysis model generation unit 12 reads in at least the thermal network data of the resistor from the storage device 30 according to instructions from the setting unit 11, and generates an analysis model of an electronic circuit necessary for the thermal analysis of the resistor on the basis of that thermal network data.

The analysis unit 13 analyzes the temperature of the resistor by using an analysis model of an electric circuit generated by the analysis model generation unit 12. The analysis unit 13 analyzes the temperature of a predefined portion in the thermal resistance model when a predefined value is set as the applied power to the resistor, on the basis of that set value.

In the present embodiment, the finite element method is used for the thermal fluid analysis of the substrate and the electronic components other than the resistor, and the thermal network method is used for the thermal analysis of the resistor. Hereinafter, the thermal fluid analysis model applying the finite element method will be called detail model, and the thermal analysis model applying the thermal network method will be called thermal resistance model.

Although the thermal fluid analysis using the detail model requires detailed information such as the dimension within the component and physical property values of the component, as a matter of fact it is difficult to acquire detailed information related to the component from the component manufacturer or the like. Moreover, the detail model has high analysis accuracy, however is configured by many elements (grids). Therefore, it takes time to analyze using the detail model. On the other hand, the thermal resistance model imitates the heat transfer of the components in a simplified manner using thermal resistance; the number of settings for the elements (thermal resistance) is fewer than the detail model, and thus the analysis time is also short.

The output unit 14 executes predefined processes such as making a graph of the temperatures of each portion in the resistor analyzed by the analysis unit 13, and visualizing by computer graphics or by animation. The output unit 14 outputs an image generated by that predefined process, to the display device 40.

Figure 2:
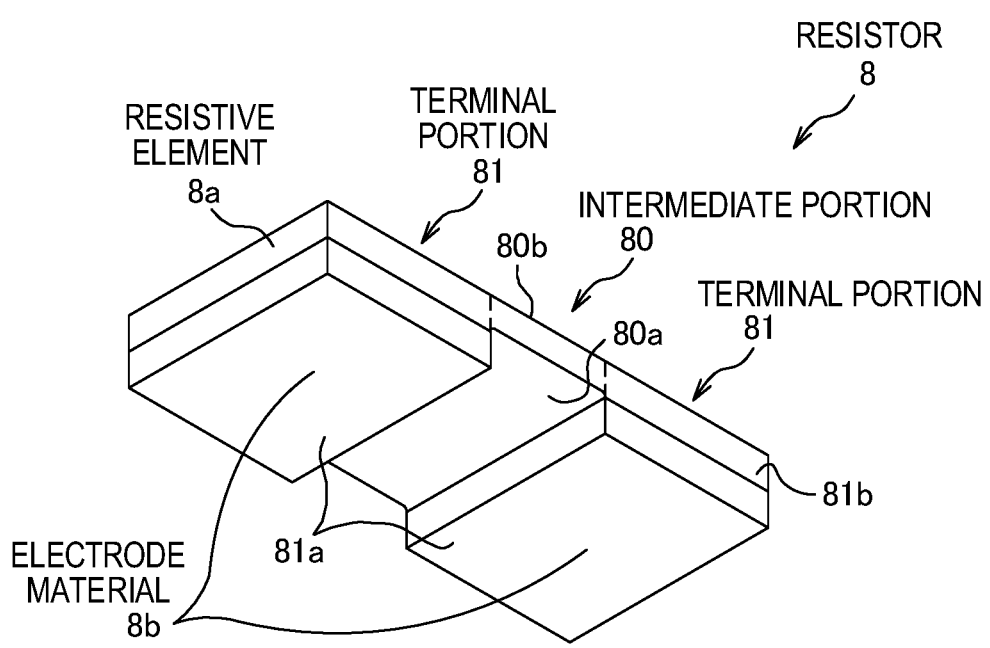
FIG. 2 is a perspective view showing one example of a structure of a resistor to be analyzed by the thermal analysis device.

Next briefly describes the structure of the resistor subject to analysis by the thermal analysis device 10, with reference to FIG. 2.

FIG. 2 is a perspective view showing a shape of a resistor 8 in the present embodiment.

The resistor 8 is a metal plate resistor (chip resistor) used in current detection. The resistance of the resistor 8 is a value smaller than several hundred mΩ (milli-ohm), for example several ten mΩ to several mΩ.

The resistor 8 includes a resistive element 8a, and a pair of electrode materials 8b stacked on one plane of the resistive element 8a. As the resistive element 8a, for example Cu—Ni based, Ni—Cr based, or Cu—Mn based materials are used, and as the electrode materials 8b, for example Cu or the like is used. The resistor 8 is formed symmetrical about a center of the resistive element 8a in a longitudinal direction of the resistor 8, which longitudinal direction is a direction extending between the pair of electrode materials 8b.

Among outer planes of the electrode materials 8b, a joining plane 81a in a stacking direction of the resistive element 8a and electrode materials 8b is connected to an electrode layer in a surface of the substrate with solder. The resistor 8 is electrified from the electrode layer of the substrate via one of the electrode materials 8b to the other one of the electrode materials 8b, and by applying power to the resistor 8, the electric energy applied on the resistive element 8a between the pair of electrode materials 8b is converted into thermal energy. Since most of the applied power on the resistor 8 is converted into thermal energy, the amount of heat generated by the resistor 8 may be considered equivalent to the power applied on the resistor 8.

In the following description, a part in the resistive element 8a that is separated from the substrate and that mainly generates heat is called intermediate portion 80. Furthermore, a part configured of both sides of the resistive element 8a excluding the intermediate portion 80 and the pair of electrode materials 8b, and which part is connected to the substrate on both sides of the intermediate portion 80 is called terminal portion 81.

The heat generated at the intermediate portion 80 is dissipated to an external space or fluid such as open air from an outer plane 80a of the resistor 8 and an upper plane 80b opposite of the outer plane 80a.

Figure 3:
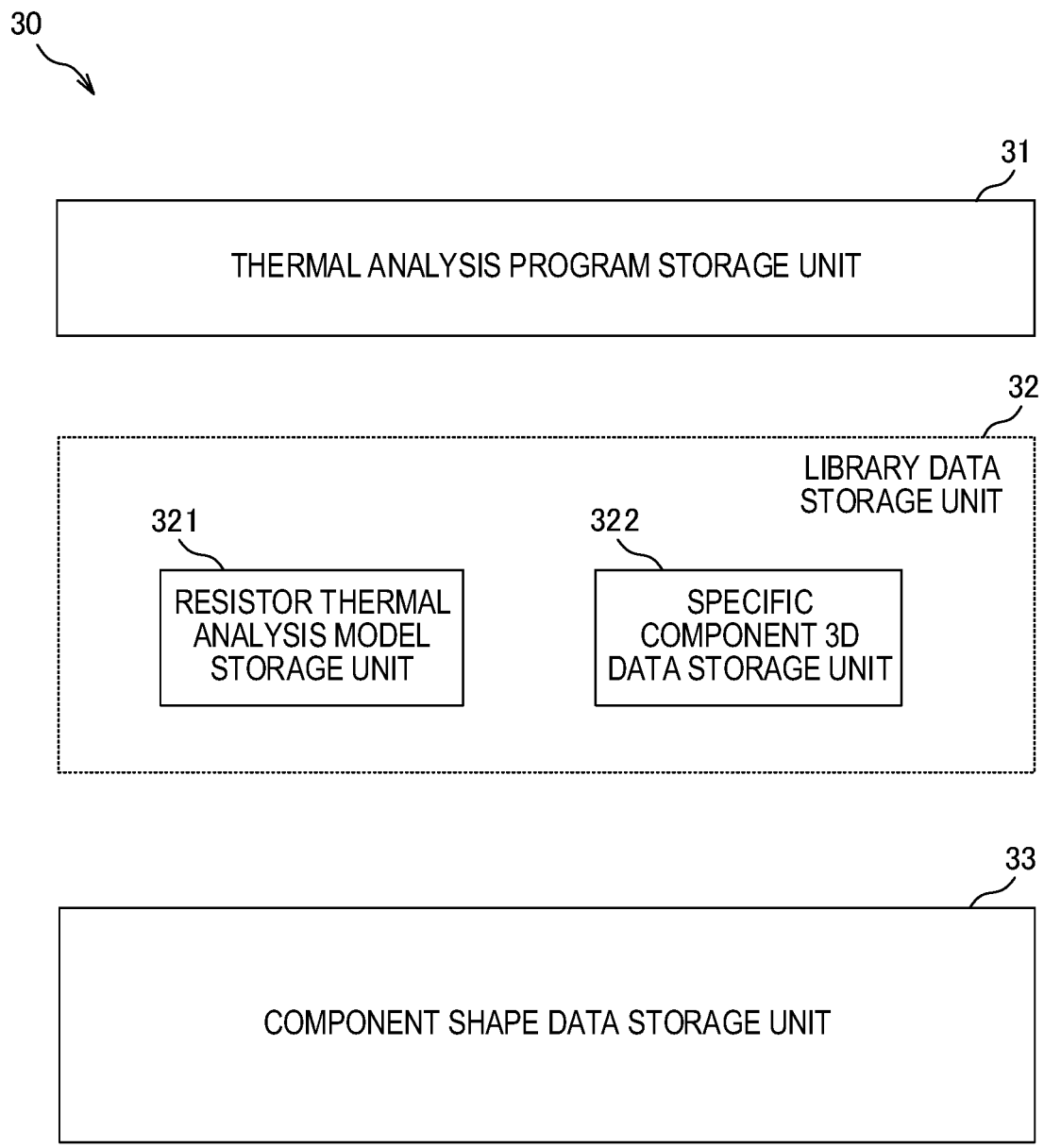
FIG. 3 is a block diagram showing a configuration of a storage device in the present embodiment.

FIG. 3 is a block diagram showing an internal configuration of the storage device 30 in the present embodiment.

The storage device 30 includes a thermal analysis program storage unit 31, a library data storage unit 32, and a component shape data storage unit 33.

The thermal analysis program storage unit 31 stores the thermal analysis program that controls operation of each part of the thermal analysis device 10, as described above. As this thermal analysis program, for example a dedicated thermal fluid analysis software, a general-purpose three-dimensional CFD (Computational Fluid Dynamics) software or the like is used.

The library data storage unit 32 stores component data readable in accordance with instructions from the setting unit 11 while executing the thermal analysis program. The library data storage unit 32 includes a resistor thermal analysis model storage unit 321 and a specific component three-dimensional data storage unit 322.

The resistor thermal analysis model storage unit 321 stores the thermal network data of the resistor 8 described above. The thermal network data of the resistor 8 includes a thermal resistance model for analyzing the temperature of the resistor 8 by using the thermal network method.

The thermal network data of the present embodiment includes, in addition to the thermal resistance that imitates the heat transfer within the resistor 8, shape data for specifying a position of an apex, curve or the like that forms the shape of the resistor 8. This thermal network data is, for example, stored per type or product of the resistor 8. As such, the resistor thermal analysis model storage unit 321 is a computer-readable storage medium that records the thermal resistance model of the resistor 8.

The specific component three-dimensional (3D) data storage unit 322 stores three-dimensional data including the dimensions and physical property values for the substrate or the specific electronic components. Examples of the specific electronic components include a semiconductor chip and a substrate heater. The three-dimensional data is used in generating the detail model and the like.

The component shape data storage unit 33 includes shape data that indicate detailed dimensions of the substrate or the electronic components. The shape data is, as with the three-dimensional data, used in generating the detail model. Examples of the shape data include CAD (computer aided design) data.

Figure 4:
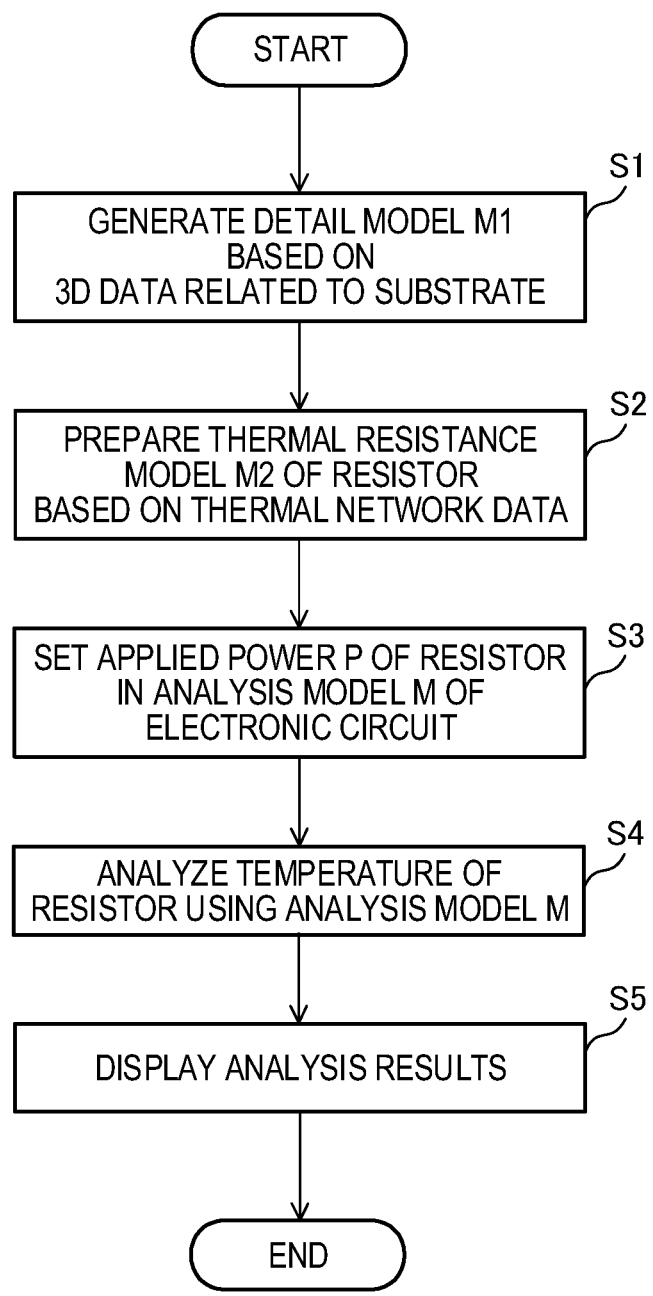
FIG. 4 is a flowchart showing a thermal analysis method of a resistor in the present embodiment.

Next describes a thermal analysis method for analyzing the temperature of the resistor 8, with reference to FIG. 4.

FIG. 4 is a flowchart showing an example of a processing procedure for the thermal analysis method in the present embodiment.

In step S1, the analysis model generation unit 12 generates a detail model M1 of an electronic circuit board including the substrate, on the basis of three-dimensional data related to the substrate. The three-dimensional data may be data in which the dimensions and physical property values of the components are set by the setting unit 11, or may be CAD data in which detailed dimensions of components are set in advance.

In step S2, the analysis model generation unit 12 reads in the thermal network data of the resistor 8 from the resistor thermal analysis model storage unit 321 of the storage device 30. Then the analysis model generation unit 12 generates a thermal resistance model M2 of the resistor 8 on the basis of the thermal network data.

The analysis model generation unit 12 generates, on the basis of a boundary condition set by the setting unit 11, an analysis model M of the electric circuit by thermally connecting the thermal resistance model M2 of the resistor 8 to the detail model M1 of the electric circuit board. More specifically, the setting unit 11 arranges a position of the thermal resistance model M2 of the resistor 8 on the detail model M1 of the electric circuit board. Then the setting unit 11 sets the boundary condition so that heat is transferred from the terminal portions 81 in the resistor 8 to the electrode layer of the substrate.

In step S3, the setting unit 11 sets an applied power (amount of generated heat) P to the resistor 8 to a predefined value with respect to the thermal resistance model M2 of the resistor 8 included in the analysis model M of the electric circuit. The predefined value is set for example by an analyst manipulating the input device 20.

In step S4, the analysis unit 13 analyzes the temperature of each of the intermediate portion 80 and the pair of terminal portions 81, by using the analysis model M of the electronic circuit and on the basis of the applied power P set by the setting unit 11.

In step S5, the output unit 14 performs a predefined process to display an analysis result of different part in the resistor 8 on the display device 40.

Figure 5:
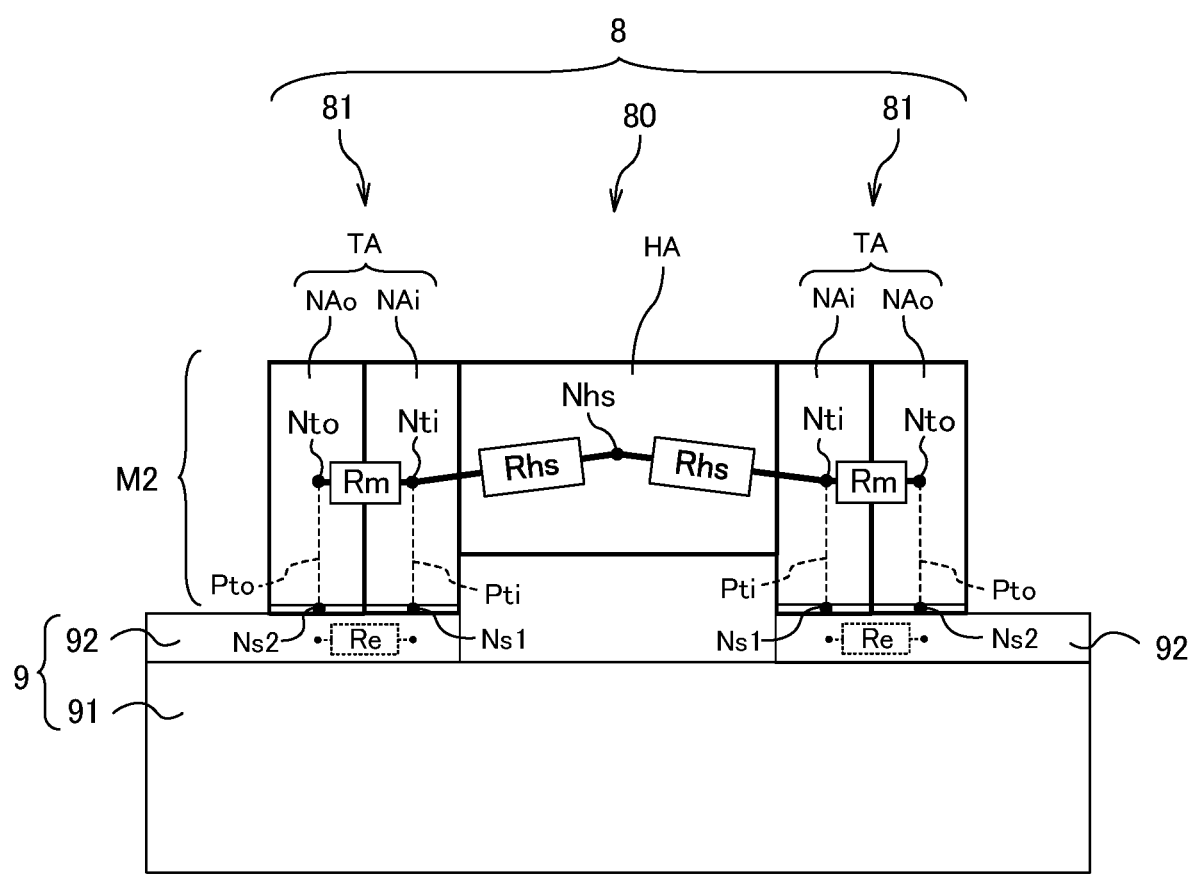
FIG. 5 is a view showing a basic configuration of a thermal analysis model of the resistor in the present embodiment.
Figure 6:
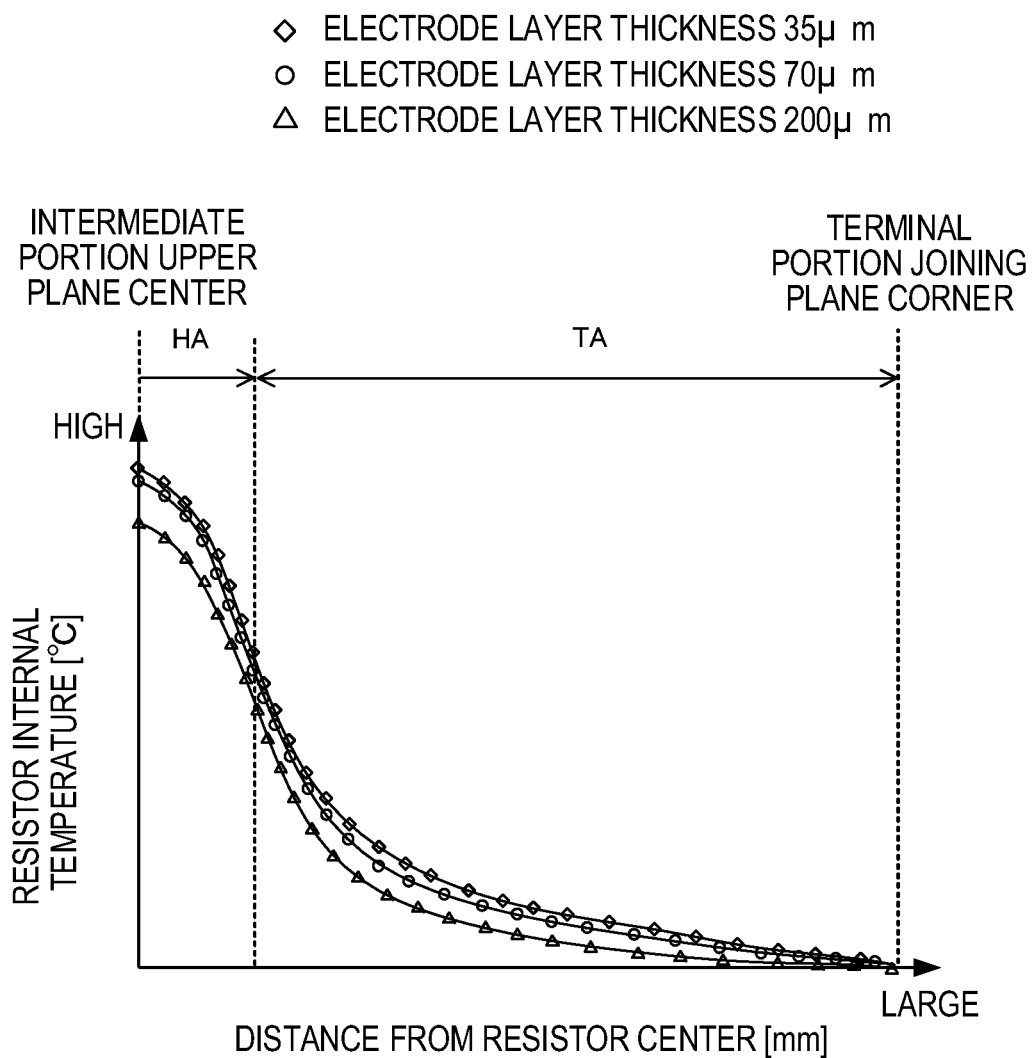
FIG. 6 is a reference diagram showing a relationship between a temperature distribution within the resistor and the thickness of an electrode layer in the substrate.

Next describes a method for generating the thermal resistance model M2 of the resistor 8, with reference to FIGS. 5 and 6.

FIG. 5 is a circuit diagram showing a basic configuration of the thermal resistance model M of the resistor 8 in the present embodiment. In this drawing, together with the basic configuration of the thermal resistance model M2, a cross-sectional shape of the electronic circuit mounting the resistor 8 on the substrate 9 is shown in a stacked manner. The substrate 9 is a printed circuit board stacking an electrode layer 92 such as Cu on a surface of an insulation substrate 91 such as FR4 (glass epoxy substrate).

In generating the thermal resistance model M2 of the resistor 8, an intermediate area HA representing the intermediate portion 80 and terminal portion areas TA representing each of the pair of the terminal portions 81 are set. The intermediate area HA and the terminal portion areas TA are set on the basis of the dimension of the resistor 8.

The terminal portion areas TA are divided into an inside node area NAi that imitates inside areas of the terminal portions 81 adjacent to the intermediate portion 80, and an outside node area NAo separated from the intermediate portion 80 and that imitates outside areas of the terminal portions 81 adjacent to the inside areas.

The thermal resistance model M2 is set with an intermediate node Nhs belonging to the intermediate area HA, terminal portion inside nodes Nti belonging to the pair of inside node areas NAi, and terminal portion outside nodes Nto belonging to the pair of outside node areas NAo. The intermediate node Nhs, the terminal portion inside nodes Nti, and the terminal portion outside nodes Nto can be set to any position within the area to which the nodes belong.

The terminal portion inside nodes Nti serve as a starting point of a first heat dissipation path Pti from the terminal portions 81 to the substrate 9, and the terminal portion outside nodes Nto serve as a starting point of a second heat dissipation path Pto from the terminal portions 81 to the substrate 9. Hereinafter, the terminal portion inside nodes Nti are simply called inside nodes Nti, and the terminal portion outside nodes Nto are simply called outside nodes Nto.

The thermal resistance model M2 is further set with, for each terminal portion area TA, a first thermal resistance Rhs connecting the intermediate node Nhs with the inside node Nti, and a second thermal resistance Rm connecting the inside node Nti with the outside node Nto. The second thermal resistance Rm is arranged parallel to a different element of the detail model M that imitates a thermal resistance Re of the electrode layer 92 of the substrate 9 between the first heat dissipation path Pti and the second heat dissipation path Pto. The different element of the detail model M1 in the present embodiment is configured of a plurality of grids.

Each of the first thermal resistance Rhs and the second thermal resistance Rm is set in advance on the basis of a result of analyzing a temperature distribution of the resistor 8 by using the detail model of the resistor 8 different from the thermal resistance model M2, or a result of actually measuring the temperature of a specific part of the resistor 8. Details thereof will be described later with reference to FIG. 9.

As such, the basic configuration of the thermal resistance model M2 of the resistor 8 arranges a configuration of connecting the first thermal resistance Rhs and the second thermal resistance Rm in series about the intermediate node Nhs side to side along the surface of the substrate 9.

Next, in generating the analysis model M of the electronic circuit, the basic configuration in the thermal resistance model M2 of the resistor 8 is thermally connected to the detail model M1 that imitates the heat transfer of the substrate 9.

More specifically, the thermal resistance model M2 is set with the first heat dissipation path Pti that connects the inside node Nti to a joining plane node Ns1, and the second heat dissipation path Pto that connects the outside node Nto to a joining plane node Ns2. The joining plane nodes Ns1 and Ns2 are nodes that imitate a joining plane 81a, which joining plane 81a joins to the electrode layer 92 in each of the inside area and outside area of the terminal portions 81, and the joining plane nodes Ns1 and Ns2 are set at positions different from each other. This thus allows for both ends of the second thermal resistance Rm to be connected in parallel with respect to an area representing the electrode layer 92 of the detail model M1.

Further, with respect to each grid of the detail model M1 adjacent to the joining planes 81a in the inside area and the outer area area of the terminal portion 81, boundary conditions are set so that the amount of heat on the joining plane nodes Ns1 and Ns2 are allotted evenly. The boundary conditions may be set so that as the grids of the detail model M1 become separated from the intermediate portion 80, the amount of heat allotted to the grids of the detail model M1 is reduced.

Next describes functions of the basic configuration in the thermal resistance model M2 of the resistor 8 in details.

First, as the basic configuration of the thermal resistance model M2, two first thermal resistances Rhs that imitate the heat transfer flowing from the intermediate portion 80 to the terminal portions 81 on both sides are set. The reason for this is as described below.

Generally, in semiconductor circuits, heat generated at a heat generating portion that serves as its heat source is easily transferred in a vertical direction with respect to the substrate, and is difficult to be transferred in a horizontal direction. In the resistor, since the thermal resistance in the horizontal direction of the intermediate portion is further greater as compared to the thermal resistance of the semiconductor circuit, the heat flowing to each of the terminal portions from the intermediate portion is particularly difficult to be transferred. Therefore, in the analysis model, no heat transfer from the intermediate portion to the terminal portions was taken into consideration.

On the other hand, the resistor 8 subject to thermal analysis of the present embodiment is of a structure in which the intermediate portion 80 is separated from the substrate 9. Therefore, as compared to the amount of heat transferred from the intermediate portion 80 to the substrate 9 via outside air, the amount of heat transferred from the intermediate portion 80 via each of the terminal portions 81 become greater.

Therefore, in the thermal resistance model M2 of the resistor 8, by setting the first thermal resistance Rhs along the longitudinal direction of the resistor 8, it is possible to imitate the heat transferred from the intermediate portion 80 different from each other to the electrode layer 92 via the terminal portions 81 on both sides. This causes the heat at the intermediate node Nhs in the thermal resistance model M2 to be dissipated towards the area of the electrode layer 92, thus reducing the temperature calculated at the intermediate node Nhs and comes closer to a true value. Hence, it is possible to reduce analysis error in the temperature of the intermediate portion 80.

In addition, as the basic configuration of the thermal resistance model M2, the second thermal resistance Rm that imitates the heat transfer from the inside area of the terminal portions 81 to the outside area thereof is set to each of the terminal portion areas TA. The reason for this is as described below.

Generally, when the thermal resistance of the intermediate portion 80 is sufficiently greater than the thermal resistance of the terminal portions 81, or when the applied power P to the resistor 8 is small, the amount of heat dissipated from the intermediate portion 80 to the electrode layer 92 via the terminal portions 81 becomes small.

However, in recent years, there is a tendency that the applied power P to the resistor 8 increases, and that the amount of transferred heat from the intermediate portion 80 to the terminal portions 81 increases. In particular, in a small resistor 8 with a small resistance, since the thermal resistance of the intermediate portion 80 in the longitudinal direction is not sufficiently greater than the thermal resistance of the terminal portions 81, the amount of heat transferred from the intermediate portion 80 to the terminal portions 81 tend to increase even further.

On the other hand, in the electrode layer 92, the thermal resistance Re exists parallel to the second thermal resistance Rm. Therefore, when a magnitude of the thermal resistance Re of the electrode layer 92 changes, the amount of heat dissipated from the inside area of the terminal portions 81 to the electrode layer 92 changes largely as compared to the amount of heat dissipated from the outside area of the terminal portions 81 to the electrode layer 92. For example, the more the thickness of the electrode layer 92 increases, the less the thermal resistance Re of the electrode layer 92 decreases. Hence, the amount of heat transferred through the second thermal resistance Rm is reduced and with reducing the amount of heat, the amount of heat dissipated from the inside area of the terminal portions 81 to the electrode layer 92 increases.

As such, since the amount of dissipated heat from the terminal portions 81 to the electrode layer 92 increases as the thickness of the electrode layer 92 increases, this facilitates the decrease in the temperature of the intermediate portion 80. On the contrary, since the amount of dissipated heat from the terminal portions 81 to the electrode layer 92 decreases as the thickness of the electrode layer 92 decreases, this makes the temperature of the intermediate portion 80 difficult to decrease.

Therefore, in the resistor 8 in which the intermediate portion 80 is separated from the substrate 9 as described above, the amount of heat transferred from the intermediate portion 80 to the terminal portions 81 is greater than a resistor in which the intermediate portion 80 is not separated from the substrate 9. Hence, the change in the amount of dissipated heat from the terminal portions 81 to the electrode layer 92 caused by the difference in thickness of the electrode layer 92 becomes greater even more. Regarding this point, a relationship between the thickness of the electrode layer 92 and the temperature distribution of the intermediate portion 80 is briefly described with reference to FIG. 6.

FIG. 6 is a view showing one example of a temperature distribution of the resistor 8 analyzed using the detail model. In this drawing, the horizontal axis represents a distance from the center of an upper plane 80b of the intermediate portion 80 in the longitudinal direction of the resistor 8, and the vertical axis represents an internal temperature of the resistor 8.

As shown in FIG. 6, the temperature distribution from the center on the upper plane 80b in the intermediate portion 80 to an edge of the joining planes 81a in the terminal portions 81 changes in accordance with the thickness of the electrode layer 92. More specifically, as the thickness of the electrode layer 92 decreases, namely as the heat dissipation of the substrate 9 deteriorates, the internal temperatures of the terminal portions 81 become easily increased. Then the temperature of a hot spot where the temperature becomes maximum in the intermediate portion 80 increases. Therefore, when the thickness of the electrode layer 92 set by an analyst of the thermal analysis device 10 deviates from an assumed value determined at the time of generating the thermal resistance model, the analysis error becomes great.

As a measure for this, by setting the second thermal resistance Rm in the terminal portion areas TA of the thermal resistance model M2, the amount of dissipated heat from the terminal portion 81 that fluctuates in accordance with the magnitude of the thermal resistance Re of the electrode layer 92 to the electrode layer 92 can be accurately imitated. This allows for analyzing the temperatures of the intermediate portion 80 and the pair of terminal portions 81 upon taking into consideration the substrate 9, with good accuracy.

The present embodiment described an example in which each of the first thermal resistance Rhs and the second thermal resistance Rm is configured of one thermal resistance. However, each of the first thermal resistance Rhs and the second thermal resistance Rm of the present embodiment may be of a configuration connecting a plurality of thermal resistance components in series to increase the number of analysis points, or may be of a configuration connecting the plurality of thermal resistance components in parallel. These configurations can be identified as one having similar functions as the first thermal resistance Rhs and the second thermal resistance Rm.

Figure 7:
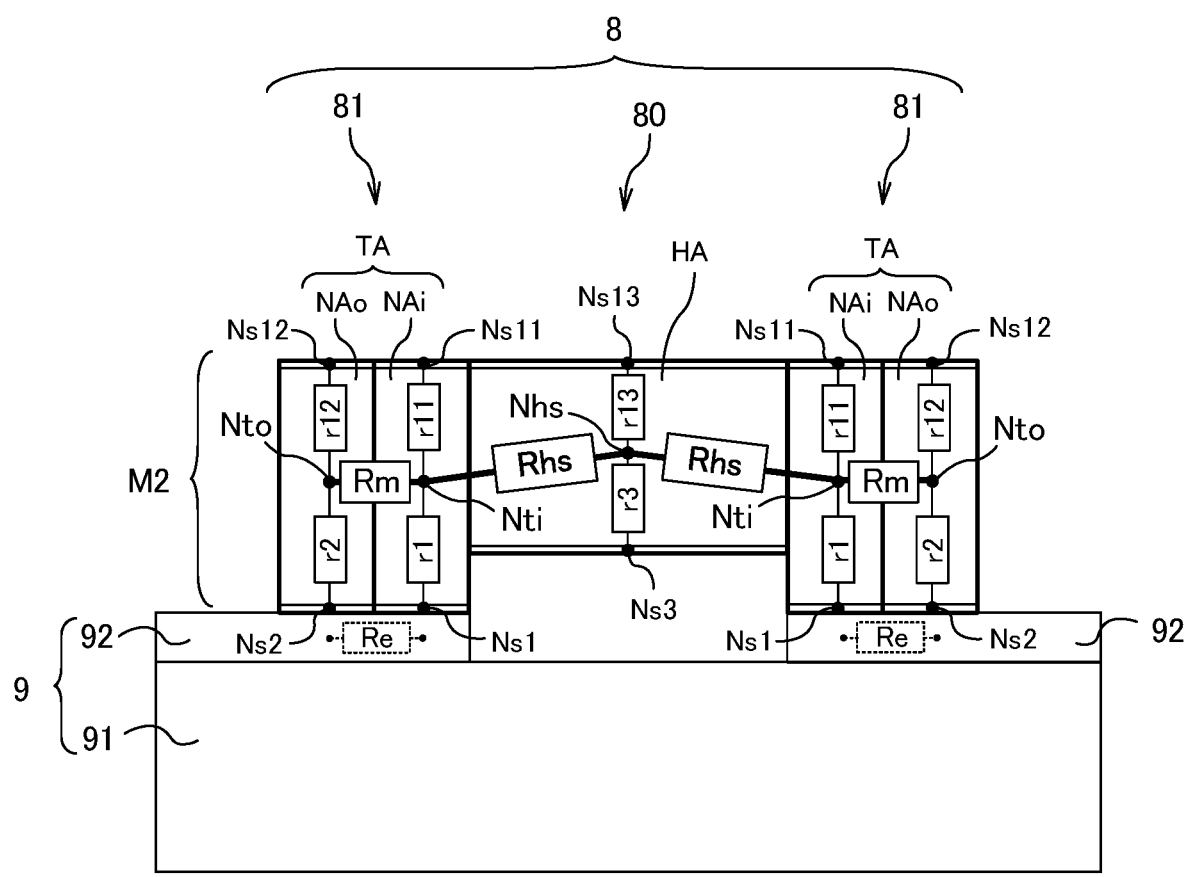
FIG. 7 is a view showing an example applying the thermal analysis model of the resistor to a specific software.

Next describes the thermal network data of the resistor 8 stored in a library of a specific thermal analysis program, with reference to FIGS. 7 and 8.

FIG. 7 is a view showing a detailed configuration example of the thermal resistance model M2 generated by the thermal network data of the resistor 8. In this example, a three-dimensional CFD software "FloTHERM" manufactured by Mentor Graphics Japan is run in the thermal analysis device 10, as a specific thermal analysis program.

The thermal resistance model M2 includes, in addition to the basic configuration shown in FIG. 5, an outer plane node Ns11 opposite to the joining plane node Ns1, and an outer plane node Ns12 opposite to the joining plane node Ns2, for each terminal portion area TA.

In the terminal portion areas TA, a thermal resistance r1 is connected to the joining plane node Ns1 and a thermal resistance r11 is connected to the outer plane node Ns11 each from the inside node Nti, and a thermal resistance r2 is connected to the joining plane node Ns2 and a thermal resistance r12 is connected to the outer plane node Ns12 each from the outside node Nto. The thermal resistance r1 and the thermal resistance r2, as with the first heat dissipation path Pti and the second heat dissipation path Pto shown in FIG. 5, are heat paths for dissipating heat to an area imitating the electrode layer 92, in parallel from each end of the second thermal resistance Rm.

The thermal resistance model M2 further includes outer plane nodes Ns3 and Ns13 that imitate outer planes in a vertical direction with respect to a direction extending between the pair of terminal portion areas TA in the intermediate area HA. Furthermore, from the intermediate node Nhs, thermal resistances r3 and r13 are connected to the outer plane nodes Ns3 and Ns13, respectively.

As such, by setting the thermal resistances r11 to r13 to the thermal resistance model M2, radiation from the upper plane 80b of the resistor 8 to outside air, and heat dissipation by convection are imitated. Hence, it is possible to analyze the temperature of each part in the resistor 8 with good accuracy.

Furthermore, by setting the outer plane node Ns3 to the thermal resistance model M2, each temperature of the outer plane 80a in the intermediate portion 80 can be analyzed, and the analyst can recognize an effect by the radiated heat from the intermediate portion 80 to the substrate 9.

In this embodiment, the thermal resistances r3 and r11 to r13 were set to take into consideration the effect by the outside air, however such thermal resistance is one required in the thermal analysis of components as a matter of course, and can be regarded in the same light as a configuration of the thermal resistance model M2 of the present embodiment.

FIG. 8 is a view showing thermal resistance values shown in the thermal network data of the resistor 8 in the present embodiment.

In the present embodiment, a value of around two digits [° C./W] is set for the first thermal resistance Rhs, and for example, a thermal resistance of around 15 is set. The second thermal resistance Rm is set with a value of about one digit [° C./W], and for example a thermal resistance value of around 4 is set. These setting methods are described with reference to FIG. 9.

Moreover, each of the thermal resistances r1 to r3 is set as heat paths, and each of the thermal resistances r1 to r3 is set as "0.1" being a lower limit value of a range that can be set in FloTHERM. The same applies for the thermal resistances r11 to r13.

The thermal network data is set with positional data showing a positional relationship of each node having a reference position of the thermal resistance model M2 (for example, the center of gravity in the intermediate area) serve as a base point, and shape data specifying locations of a plurality of apex positions that form the shape of the resistor 8.

Moreover, the present embodiment sets the thermal resistances r3 and r11 to r13 for taking into consideration the effect by the outside air, however it is not limited to this. For example, in a case of using a thermal analysis program that considers the effect by the outside air even if not setting these thermal resistances, or in a case that the effect by the outside air is insignificant, the thermal resistances r3 and r11 to r13 may be omitted. Moreover, in a case of using a thermal analysis program that can set the value of the thermal resistance in the analysis model as "0", each of the thermal resistances r1 to r3 and the thermal resistances r11 to r13 may be set as "0".

Figure 9:
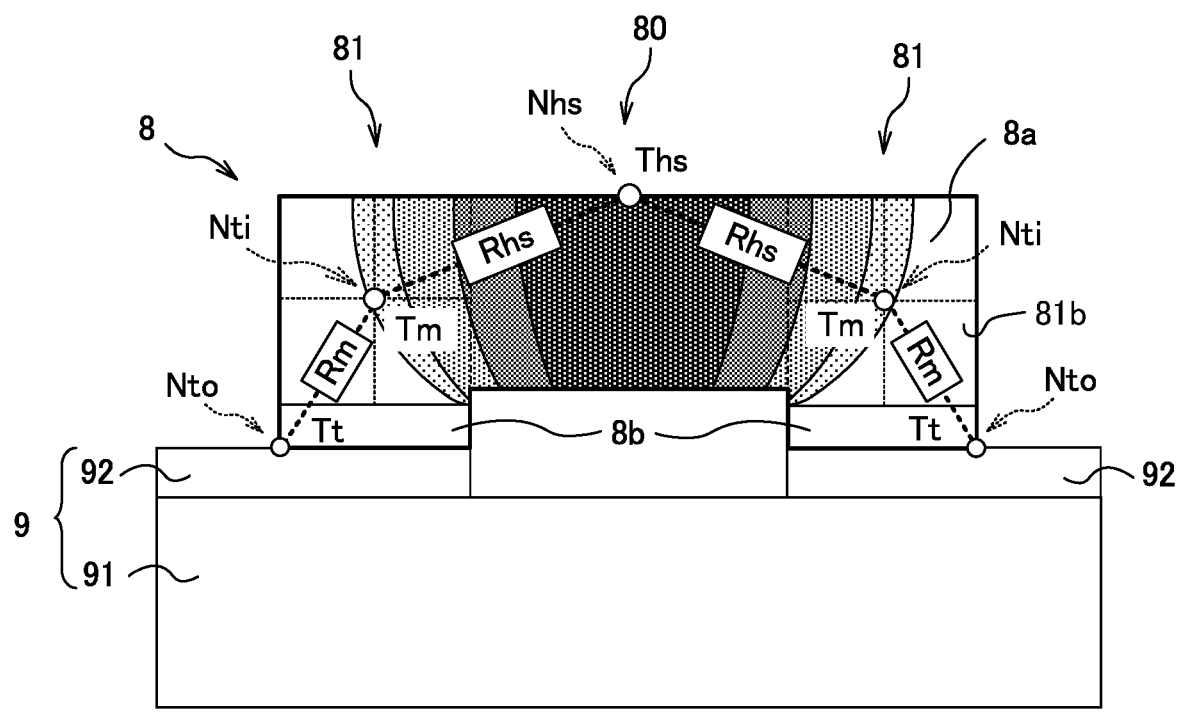
FIG. 9 is a view showing a setting example of a thermal resistance configuring the thermal analysis model of a resistor.

Next describes corresponding parts of the resistor 8 that correspond to each node in the thermal resistance model M2, with reference to FIG. 9.

FIG. 9 is a view showing a corresponding relationship between temperatures calculated from each node after executing thermal analysis by the thermal resistance model M2, and temperatures of the corresponding parts of the resistor 8 corresponding to each node.

In this embodiment, in calculating each value of the first thermal resistance Rhs and the second thermal resistance Rm, analysis results of a detail model different from the thermal resistance model M2 is used. Therefore, an analysis result of the temperature distribution within the resistor 8 in a state applying power P by using the detail model is shown overlapped on the thermal resistance model M2. The analysis result of the detail model is shown as a darker color, as the internal temperature of the resistor 8 increases.

So that the calculated temperature of the intermediate node Nhs represents the temperature of a hot spot equivalent to a part at which the temperature becomes the highest in the intermediate portion 80, the first thermal resistance Rhs is determined.

More specifically, in calculating the first thermal resistance Rhs, so that the calculated temperature of the intermediate node Nhs corresponds to the temperature of the hot spot in the intermediate portion 80, an analysis temperature Ths at a center position on the upper plane 80b of the intermediate portion 80 is used among the analysis results of the detail model.

So that the calculated temperature of the inside node Nti represents a temperature of an intermediate point equivalent to a part in which analysis accuracy of the thermal resistance model M2 becomes high in the terminal portions 81, the first thermal resistance Rhs and the second thermal resistance Rm is determined.

More specifically, in calculating each of the first thermal resistance Rhs and the second thermal resistance Rm, so that the calculated temperature of the inside node Nti corresponds to the temperature of an intermediate point of the terminal portions 81, an analysis temperature Tm at a center position on a side plane of the resistive element 8a included in the terminal portions 81 is used. The side plane of the resistive element 8a is a plane including the longitudinal direction of the resistor 8 and a stacking direction of the terminal portions 81.

So that the calculated temperature of the outside node Nto represents a temperature of an end point positioned at an outside end of the terminal portions 81 in the longitudinal direction of the resistor 8, the second thermal resistance Rm is determined.

More specifically, in calculating the second thermal resistance Rm, so that the calculated temperature of the inside node Nti corresponds to the temperature of the end point of the terminal portions 81, an analysis temperature Tt at a corner position of the joining plane 81a in the electrode material 8b is used.

The first thermal resistance Rhs and the second thermal resistance Rm are calculated as in the following formulae (1) and (2), by using the applied power P to the resistor 8, and the analysis temperatures Ths, Tm and Tt at corresponding positions of the resistor 8:

[Math. 1]
$$Rhs = \frac{2(Ths - Tm)}{P} \quad (1)$$

[Math. 2]
$$Rm = \frac{2(Tm - Tt)}{P} \quad (2)$$

The calculated values of each of the first thermal resistance Rhs and the second thermal resistance Rm are set in the thermal network data of the resistor 8.

As such, by analyzing the temperature of the resistor 8 by using the thermal resistance model M2 that set each value of the first thermal resistance Rhs and the second thermal resistance Rm, the calculated temperatures of each node can be treated as temperatures at the corresponding positions in the resistor 8 as described above.

As described above, the temperatures of predefined parts in the resistor 8 required in the thermal design of electronic circuits can be calculated at the intermediate node Nhs and the outside node Nto. This thus allows the analyst to recognize a temperature difference between the hot spot of the resistor 8 and the outside end in the longitudinal direction of the resistor 8.

Furthermore, as for the inside node Nti, by determining the corresponding position of the inside node Nti so as to correspond to the center position on the side plane 81b of the resistive element 8a included in the terminal portions 81, it is possible to improve the analysis accuracy of each node. More specifically, it is possible to reduce the analysis error for the temperature difference between the intermediate node Nhs and the outside node Nto to from around 10% to around 4%.

Figure 10:
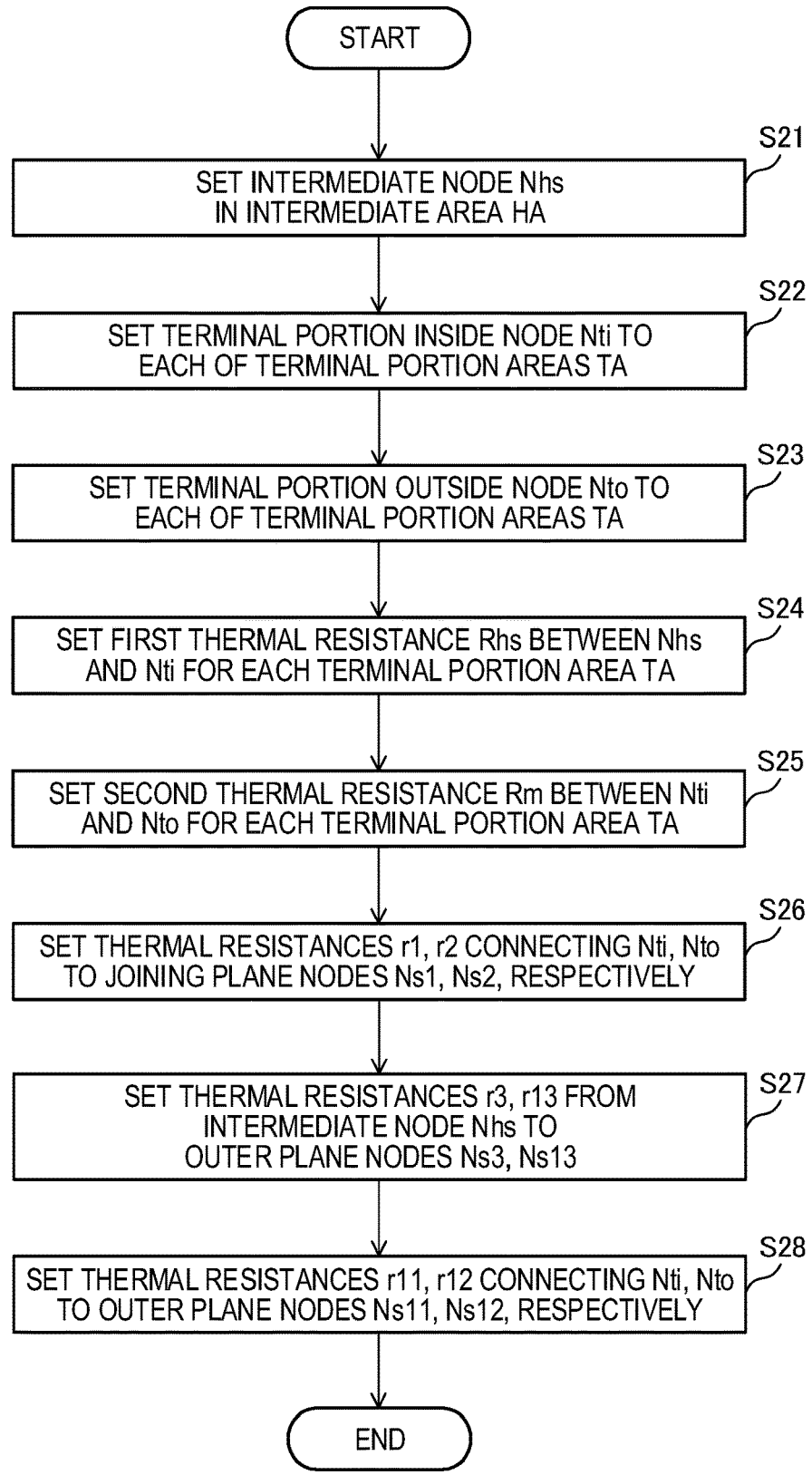
FIG. 10 is a flowchart showing a generation method of the thermal analysis model of the present embodiment.

FIG. 10 is a view for describing a generation method of the thermal resistance model M2 in the present embodiment.

First, the thermal resistance model M2 is set with a shape of the resistor 8 on the basis of the dimension of the resistor 8. For example, the center of gravity in the intermediate area HA that corresponds to the intermediate portion 80 serves as the base point, and an inside node area NAi and an outside node area NAo are set for each terminal portion area TA.

In step S21, a processor configuring the thermal analysis device 10 sets the intermediate node Nhs in the intermediate area HA of the thermal resistance model M2. The intermediate node Nhs is arranged on the display screen for example to be displayed on the center of gravity in the intermediate area HA.

Moreover, the intermediate node Nhs has corresponding information that shows which temperature of which part in the resistor 8 the calculated temperature of the intermediate node Nhs corresponds to. The corresponding information of the intermediate node Nhs in the present embodiment is set so as to show a position of that corresponds to a center position on the upper plane 80b of the intermediate portion 80 shown in FIG. 9.

In step S22, the processor sets the inside node Nti that belongs to the inside node area NAi, to each of the terminal portion areas TA. For example, the inside node Nti is arranged to be displayed on the center of gravity in the inside node area NAi. Moreover, corresponding information of the inside node Nti is set so as to show a position of the terminal portion inside area TAi that corresponds to a center position of the side plane 81b in the resistive element 8a shown in FIG. 9.

In step 23, the processor sets the terminal portion outside node Nto that belongs to the outside node area NAo, to each of the terminal portion areas TA. The outside node Nto is, for example, arranged to be displayed on the center of gravity in the outside node area NAo. Moreover, corresponding information of the outside node Nto is set so as to show a position of the terminal portion outside area TAo that corresponds to a corner position of the joining plane 81a of the electrode material 8b shown in FIG. 9.

In step S24, the processor sets the first thermal resistance Rhs that connects between the intermediate node Nhs and the inside node Nti, for each terminal portion area TA. The value of the first thermal resistance Rhs is, for example, calculated in advance using the above formula (1).

In step S25, the processor sets the second thermal resistance Rm that connects between the inside node Nti and the outside node Nto, for each terminal portion area TA. The value of the second thermal resistance Rm is, for example, calculated in advance using the above formula (2).

In step S26, the processor sets the thermal resistance r1 that connects the intermediate node Nti to the joining plane node Ns1, and sets the thermal resistance r2 that connects the outside node Nto to the joining plane node Ns2, to each of the terminal portion areas TA.

In step S27, the processor sets the thermal resistance r3 that connects the intermediate node Nhs to the outside plane node Ns3, and sets the thermal resistance r13 that connects the intermediate node Nhs to the outside node Ns13.

In step S28, the processor sets the thermal resistance r11 that connects the inside node Nti to the outer plane node Ns11, and sets the thermal resistance r12 that connects the outside node Not to the outer plane node Ns12, for each terminal portion area TA.

When the process of step S28 finishes, the processor generates thermal network data that show the thermal resistance model M2 of the resistor 8, and causes the series of procedures in the generation method of the thermal resistance model M2 to terminate. The procedures from steps S21 to S28 may be alternated in order.

Figure 11A:
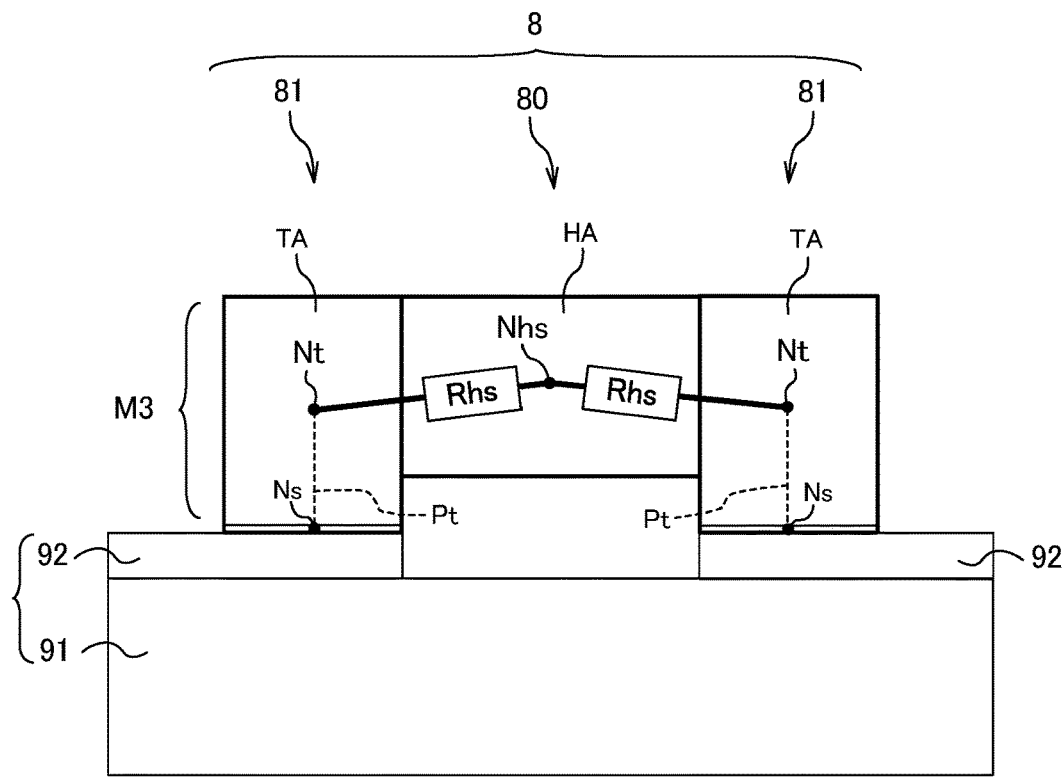
FIG. 11A is a view showing a basic configuration of a simplified model that simplifies the thermal analysis model of the resistor.
Figure 11B:
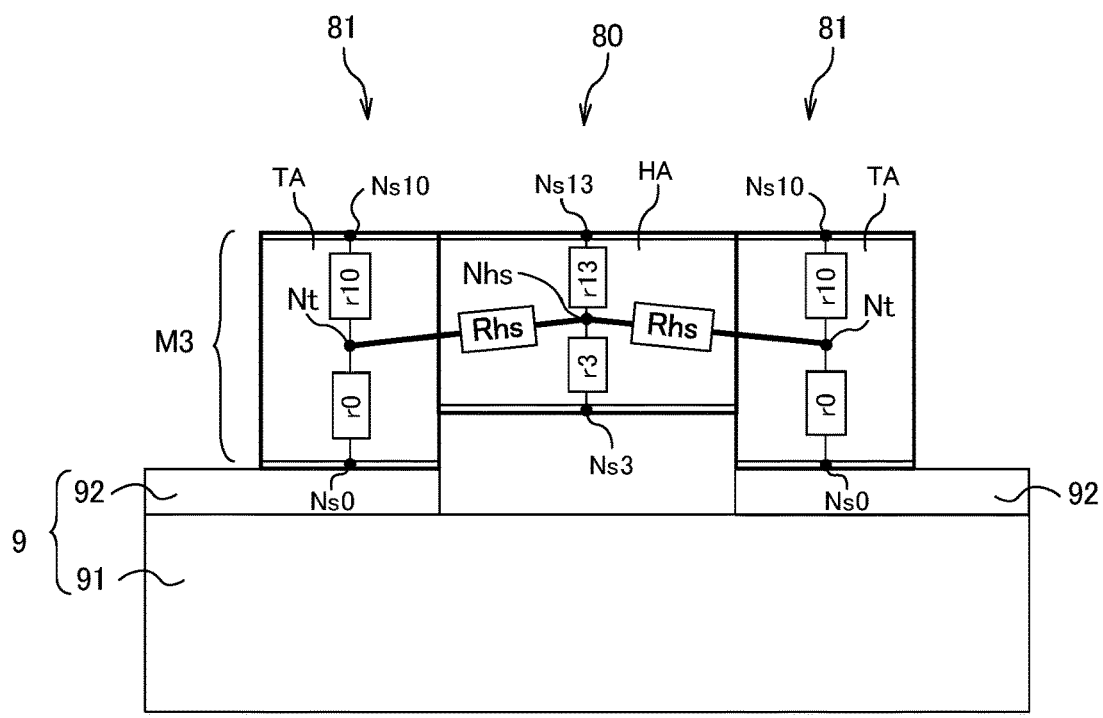
FIG. 11B is a view showing an example applying the simplified model to the specific software.
Figure 12:
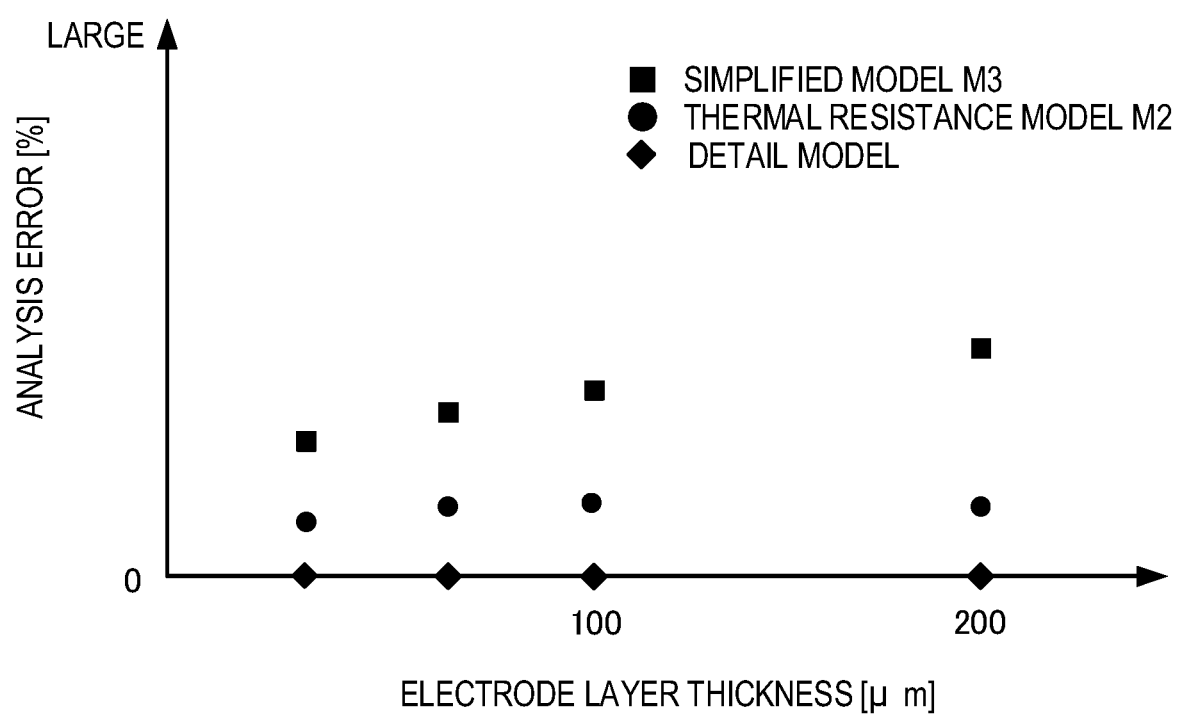
FIG. 12 is a view showing an analysis accuracy in analyzing the temperature of the resistor in the present embodiment.

Next describes the analysis accuracy of the thermal resistance model M2 of the resistor 8, with reference to FIGS. 11A, 11B, and 12.

FIG. 11A is a view showing a basic configuration of a simplified model M3 that simplifies the thermal resistance model M2 as a comparison of the thermal resistance model M2. The basic configuration of the simplified model M3 is configured of, for each terminal portion area TA, only the first thermal resistance Rhs that connects between the intermediate node Nhs and one terminal portion node Nt that belongs to the terminal portion areas TA.

FIG. 11B is a view showing a detailed configuration example of the simplified model M3 used in a specific thermal analysis program. The simplified model M3 includes, for each terminal portion area TA, a joining plane node Ns0 and an outer plane node Ns10 that imitate the joining plane 81a of the terminal portion 81 and the upper plane 80b, respectively, and a thermal resistance r0 is connected to the joining plane node Ns0 and a thermal resistance r10 is connected to the outer plane node Ns10, each from the terminal portion node Nt.

FIG. 12 is a view showing a comparison example between the analysis accuracy of the thermal resistance model M2 and the analysis accuracy of the simplified model M3. In this example, analysis errors of the thermal resistance model M2 are shown by round marks, analysis errors of the simplified model M3 are shown by square marks, and analysis errors of the detail model of the resistor 8 are shown by diamond marks.

The analysis errors of each model are values obtained on the basis of a temperature difference between the analysis temperature Ths of the hot spot in the intermediate portion 80 analyzed by using the detail model and an analysis temperature Tt at a corner position of the terminal portions 81, for each thickness of the electrode layer 92.

As shown in FIG. 12, as for the simplified model M3, a phenomenon is imitated by the first thermal resistance Rhs in which heat generated at the intermediate portion 80 is dissipated to the electrode layer 92 via the terminal portions 81, and the temperature of the intermediate node Nhs decreases as with the actual phenomenon. This thus reduces the analysis error of the simplified model M3. However, as the thickness of the electrode layer 92 increases, the analysis error of the simplified model M3 gradually increases.

In comparison, the analysis error of the thermal resistance model M2 is smaller than the analysis error of the simplified model M3, and maintains a substantially constant value even if the thickness of the electrode layer 92 increases. This is because the thermal resistance Re of the electrode layer 92 connected parallel to the second thermal resistance Rm is taken into consideration in the thermal analysis of the resistor 8, by setting the second thermal resistance Rm in the thermal resistance model M2, as shown in FIG. 5.

Accordingly, as the thickness of the electrode layer 92 increases, the amount of heat dissipated from the inside node Nti to the area of the electrode layer 92 increases and the amount of heat in the intermediate node Nhs decreases, and further the amount of heat transfer from the inside node Nti to the outside node Nto decreases. This hence reduces the temperature difference between the intermediate node Nhs and the outside node Nto, and thus it is possible to reduce the analysis error of the thermal resistance model M2.

In the thermal resistance model M2 of the present embodiment, the first thermal resistance Rhs and the second thermal resistance Rm connected in series was set side by side having the intermediate node Nhs serve as the base point as shown in FIG. 5, however this may be set to just one of them.

In this case, since the heat generated due to the applied power P to the resistor 8 is transferred to just one side of the resistor 8, the thermal analysis device 10 changes that applied power P to a value half thereof, when an applied power P is set to the intermediate node Nhs. The thermal analysis device 10, on the basis of the changed applied power P, then analyzes the temperatures of the intermediate node Nhs, the inside node Nti and the outside node Nto by using the thermal resistance model on one side. Moreover, in the case of setting the thermal resistances r1 and r13 as shown in FIG. 7, since the amount of heat transferred to the outside air from the outer plane nodes Ns3 and Ns13 will also be just one side, surface areas of the outer plane nodes Ns3 and Ns13 may be changed to half.

As such, even with the thermal resistance model M2 imitating the first thermal resistance Rhs and the second thermal resistance Rm on just one side of the resistor 8, the temperature of the resistor 8 can be analyzed by taking in consideration the effect by the substrate 9, as with the first embodiment.

Next describes an effect obtained by the thermal resistance model M2 of the resistor 8.

According to the present embodiment, the thermal resistance model M2 is the thermal analysis model that analyzes the temperature of the resistor 8 that includes an intermediate portion 80 separated from the substrate 9 and the terminal portions 81 that connect to the substrate 9 on both sides of the intermediate portion 80. This thermal resistance model M2 includes, as shown in FIG. 5, the intermediate node Nhs that imitates the intermediate portion 80 of the resistor 8, and the first thermal resistance Rhs connected to the intermediate node Nhs, and imitates at least one of the terminal portions 81 on both sides.

More specifically, at least one of the terminal portion areas TA of the thermal resistance model M2 includes the inside node Nti that imitates the inside area adjacent to the intermediate portion 80 in one of the terminal portions 81, and the outside node Nto that imitates the outside area separated from the intermediate portion 80 and adjacent to the inside area. The inside node Nti is connected to the first thermal resistance Rhs and the inside node Nti serves as a starting point of the first heat dissipation path Pti from one of the terminal portions 81 to the substrate 9. Then the outside node Nto serves as a starting point of the second heat dissipation path Pto from one of the terminal portions 81 to the substrate 9.

Furthermore, the thermal resistance model M2 includes the second thermal resistance Rm that connects between the inside node Nti and the outside node Nto. Then the second thermal resistance Rm is arranged parallel to a different element that imitates the thermal resistance Re of the electrode layer 92 in the substrate 9. The different element here is an element that configures an analysis model separate to the thermal resistance model M2, and for example the different element includes grids allotted to an area of the electrode layer 92 in the detail model M1 of the substrate 9, or a thermal resistance or the like equivalent to the thermal resistance Re of the electrode layer 92 in the thermal resistance models representing the substrate 9 as thermal resistance.

As such, by the thermal resistance model M2 including the first thermal resistance Rhs along a longitudinal direction of the resistor 8, it is possible to imitate the transfer of heat from the intermediate portion 80 to the terminal portions 81 connected to the substrate 9.

Furthermore, by including the second thermal resistance Rm in the terminal portion areas TA, it becomes possible to imitate fluctuation of the amount of dissipated heat from the terminal portions 81 to the substrate 9 in accordance with the magnitude of the heat resistance Re of the electrode layer 92 that is present in parallel to the second thermal resistance Rm.

More specifically, the amount of dissipated heat from the terminal portions 81 to the substrate 9 is determined by a combined thermal resistance Rt that combines the second thermal resistance Rm of the terminal portions 81 and the thermal resistance Re of the electrode layer 92, as shown in the following formula (3):

[Math. 3]

$$Rt = \frac{Rm \cdot \mathrm{Re}}{Rm + \mathrm{Re}} \qquad (3)$$

From the relationship of formula (3), as the thermal resistance Re of the electrode layer 92 in the substrate 9 increases, the combined thermal resistance Rt decreases, and hence the amount of dissipated heat from the terminal portions 81 to the substrate 9 increases. As such, according to the present embodiment, it is possible to imitate a phenomenon in which the amount of heat dissipated from the inside area of the terminal portions 81 to the substrate 9 changes in accordance with the change in magnitude relationship between the thermal resistance Re of the electrode layer 92 and the second thermal resistance Rm of the terminal portion 81, which thermal resistances Re and Rm are present parallel to each other.

For example, even if the thermal resistance Re of the electrode layer 92 changes by the thickness or the difference in material of the electrode layer 92, the amount of dissipated heat that passes the first heat dissipation path Pti changes as with the actual heat transfer, in accordance with the change in thermal resistance Re of the electrode layer 92. Hence, it is possible to prevent the decrease in analysis accuracy. Namely, it is possible to prevent the decrease in analysis accuracy caused by the difference in the thermal resistance Re of the electrode layer 92 in the substrate 9.

As such, by including the second thermal resistance Rm that imitates the heat transfer within the terminal portion 81, in addition to the first thermal resistance Rhs that imitates the heat transfer from the intermediate portion 80 in the resistor 8 to the terminal portion 81, it is possible to perform thermal analysis of the resistor 8 upon taking into consideration the effect by the substrate 9.

Furthermore, since the thermal resistance model M2 has fewer elements set in the thermal resistance model M2 compared to the detail model, it is possible to reduce the time required for the thermal analysis of the resistor 8. Furthermore, in order for the analyst to generate a detail model, detail information of the resistor 8 is necessary, and work by the analyst becomes complex, whereas in the case of the thermal resistance model M2, the analyst can generate a thermal analysis model of an electronic circuit easily, and allows for analyzing the temperature of the resistor 8 with good accuracy.

Therefore, according to the present embodiment, it is possible to perform thermal analysis of the resistor 8 upon taking into consideration the effect by the substrate 9, with a simple configuration.

Moreover, according to the present embodiment, the terminal portions 81 include the resistive element 8a, and the electrode material 8b stacked on the resistive element 8a, as shown in FIG. 2. Furthermore, the inside node Nti of the thermal resistance model M2 is a node that imitates the center portion of the side plane 81b of the resistive element 8a included in the terminal portions 81, as shown in FIG. 9. The side plane 81b of the resistive element 8a is a plane parallel to a vertical direction with respect to the substrate 9 and a longitudinal direction extending between the pair of terminal portions 81.

As such, by determining the calculated temperature from the inside node Nti of the thermal resistance model M2 so that the inside node Nti corresponds to the center portion on the side plane 81b of the resistive element 8a in the terminal portions 81, it is possible to improve the analysis accuracy by the thermal resistance model M2.

The reason for this is considered as effected by an analysis result of the detail model used in the calculations of the first thermal resistance Rhs and the second thermal resistance Rm. More specifically, the center portion on the side plane 81b of the terminal portions 81 is substantially equal in distance from the four planes configuring the resistive element 8a, and in thermal fluid analysis using the detail model, arithmetic error occurring at the boundary plane may easily become small. Therefore, as stated in FIG. 9, it is considered that employing the analysis temperature Tm with a small error in the calculations of the first thermal resistance Rhs and the second thermal resistance Rm improved the analysis accuracy of the thermal resistance model M2.

Moreover, according to the present embodiment, the outside node Nto is set as a node that imitates the outside end of the terminal portions 81. This thus allows for calculating the temperature of the outside end of the terminal portions 81 using the thermal resistance model M2 by the thermal analysis device 10 and displaying the calculated temperature on the display device 40. Therefore, it is possible to inform the analyst of the temperature of the outside end in the terminal portions 81 required in the thermal designing of the electronic circuit.

Moreover, according to the present embodiment, the value of the second thermal resistance Rm is determined on the basis of the difference between the temperature Tm occurring at the center portion on the side plane 81b of the resistive element 8a included in the terminal portions 81 by the applied power P to the resistor 8 and the temperature Tt occurring on the outside end of the outside area, as stated in FIG. 9. This makes it possible to reduce the errors in each calculated temperature of the intermediate node Nhs, inside node Nti and outside node Nto by the thermal analysis using the thermal resistance model M2.

Moreover, according to the present embodiment, as for the first thermal resistance Rhs and the second thermal resistance Rm, at least one ends of the thermal resistances is connected to the outer plane node Ns3, Ns11, Ns12 or Ns13 that imitate the outer planes of the areas which corresponds to the one end in the resister 8. Namely, at least one ends of the thermal resistances is connected to the outer planes of the areas HA, NAi or NAo to which the one end belongs. This hence allows for taking into account the heat radiated to the outside air from the outer plane of the resistor 8, electromagnetic waves radiated into the space and the like, in the thermal resistance model M2.

Moreover, according to the present embodiment, the outer plane node Ns3 is a node imitating the outer plane 80a facing the substrate 9, in the intermediate portion 80. By setting the outer plane node Ns3 in the thermal resistance model M2, the analyst may recognize the effect given by the heat generated on the intermediate portion 80 against the substrate 9 facing the outer plane 80a.

Moreover, according to the present embodiment, the thermal resistance model M2 imitates the other of the terminal portions 81 on both sides, by the same configuration as the one of the terminal portions 81 on both sides. This thus allows for the thermal resistance model M2 to simultaneously imitate the phenomenon of the heat generated in the intermediate portion 80 being transferred to each of the terminal portions 81 and being dissipated to the substrate 9.

Each of the first thermal resistance Rhs and the second thermal resistance Rm may be configured by a plurality of thermal resistances. For example, this is a configuration connecting a plurality of thermal resistances in parallel or in series, and even with such configuration, an effect similar to the embodiment described above is achievable.

Moreover, according to the present embodiment, the thermal analysis device 10 that analyzes the temperature of the resistor 8 includes the analysis model generation unit 12 as a preparation unit for preparing the thermal resistance model M2 of the resistor 8. Furthermore, the thermal analysis device 10 includes the setting unit 11 that sets a predefined value showing the applied power P to the resistor 8 as the amount of heat generated by the intermediate node Nhs, and the analysis unit 13 that analyzes at least one temperature among the intermediate node Nhs, inside node Nti and outside node Nto by using the thermal resistance model M2.

Hence, it is possible to analyze the temperatures of each part in the resistor 8 that is mounted on the substrate 9, upon taking into consideration the effect by the substrate 9. Therefore, the temperatures of the parts in the resistor 8 can be analyzed with good accuracy even in a case of connecting the thermal resistance model M2 of the resistor 8 to the detail model M1 of the substrate 9 greater or smaller than the thermal resistance Re of the electrode layer 92 assumed in the thermal resistance model M2.

The present embodiment described an example of analyzing the temperature of the resistor 8 at a steady state in which the power P is applied constantly. Next describes an example of analyzing the temperature of the intermediate portion 80 in a transient state from starting to apply the power P to the resistor 8 to until the temperature of the intermediate portion 80 reaches a steady state, with reference to FIGS. 13A and 13B.

Second Embodiment

Figure 13A:
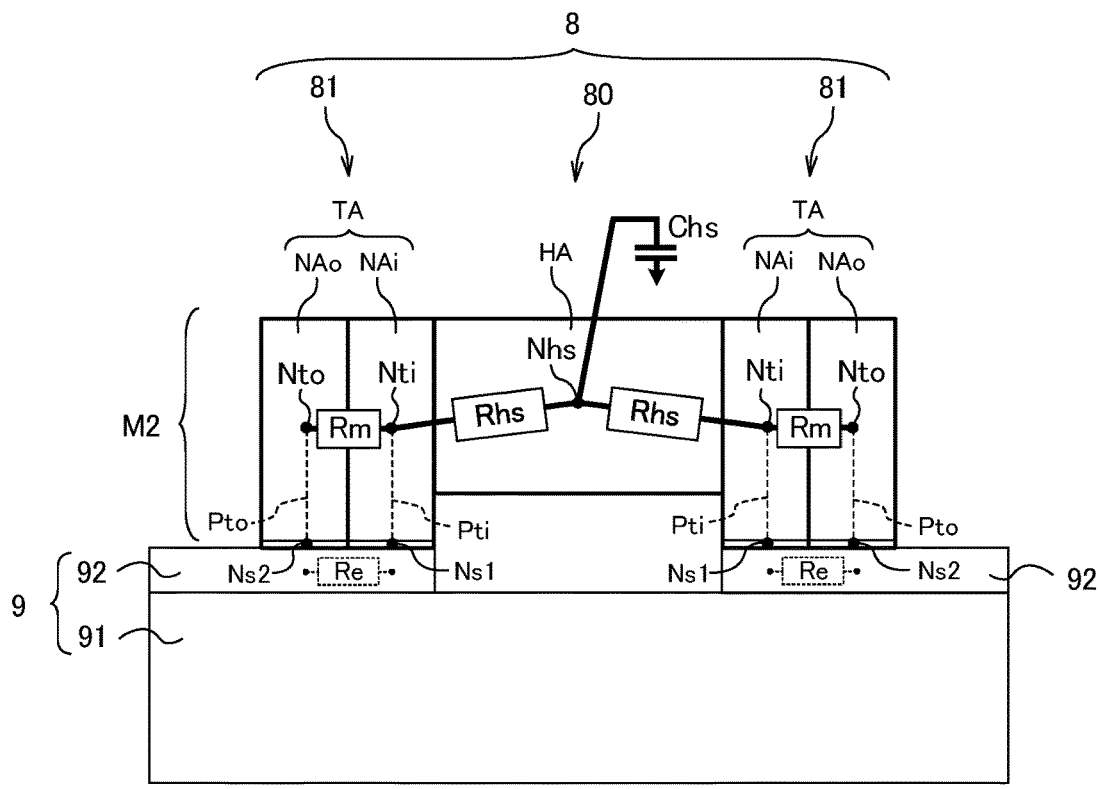
FIG. 13A is a view showing a basic configuration of a thermal analysis model of the resistor in a second embodiment.
Figure 13B:
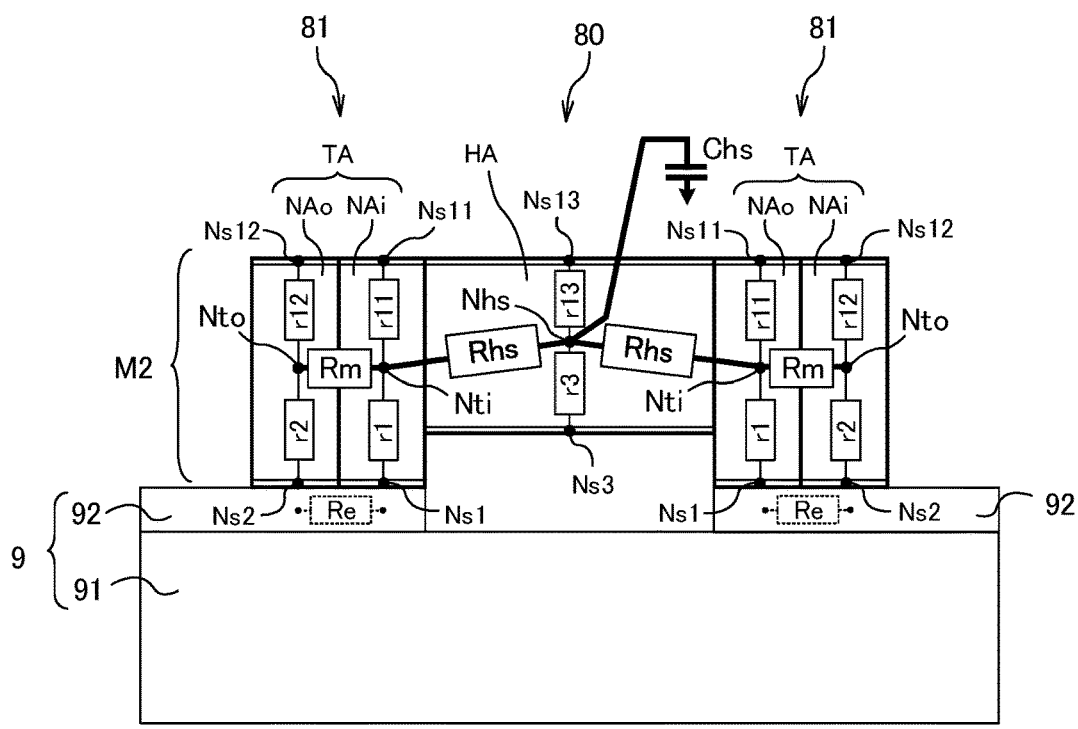
FIG. 13B is a view showing an application example of the thermal analysis model of the present embodiment.

FIG. 13A is a view showing a basic configuration in the thermal resistance model M2 of the resistor 8 in a second embodiment. FIG. 13B is a view showing an example of applying the thermal resistance model M2 shown in FIG. 13A to the specific software.

The basic configuration of the thermal resistance model M2 of the present embodiment includes, in addition to the basic configuration of the thermal resistance model M2 shown in FIG. 5, a thermal capacity (a heat capacity) Chs connected to the intermediate node Ns.

Figure 14:
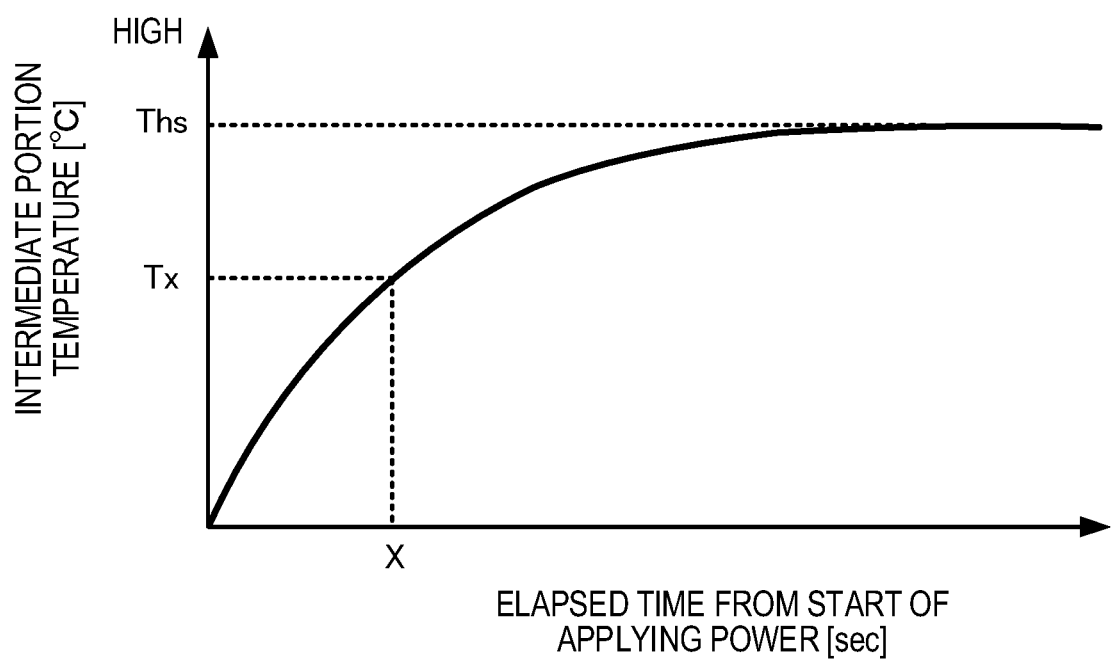
FIG. 14 is a view showing a setting example of a thermal capacity connected to an intermediate node in the thermal analysis model.

FIG. 14 is a view for describing a setting method of the thermal capacity Chs in the thermal resistance model M2. This drawing shows a temperature of the hot spot of the intermediate portion 80 at a transient state analyzed by using the detail model of the resistor 8.

An analysis temperature Ths of the hot spot at the steady state, and an analysis temperature Tx at the hot spot at time X in the transient state are found, from the analysis results of the detail model of the resistor 8. Then, using these analysis temperatures Ths and Tx and the first thermal resistance Rhs and second thermal resistance Rm, the thermal capacity Chs is calculated as in the following formula (4):

[Math. 4]

$$Chs = \frac{-2X}{(Rhs + Rm) \cdot \ln\left(1 - \frac{Tx}{Ths}\right)} \quad (4)$$

The calculated value of the thermal capacity Chs is set to the thermal network data of the resistor 8 together with the calculated values of the first thermal resistance Rhs and the second thermal resistance Rm. This embodiment used the analysis results of the detail model, however the actually measured results may also be used.

Figure 15:
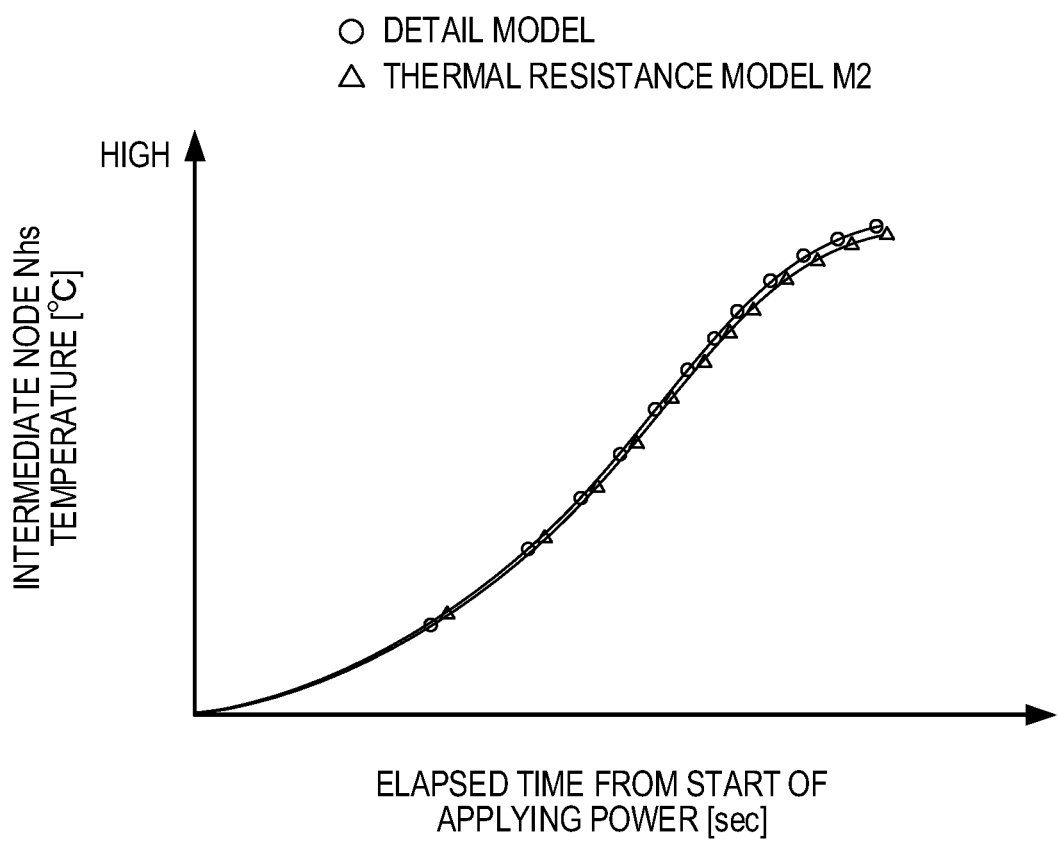
FIG. 15 is a view describing analysis accuracy of the resistor in a transient state, in the present embodiment.

FIG. 15 is a view showing the temperature of the intermediate portion 80 at the transient state analyzed by using the thermal resistance model M2 of the present embodiment. In this drawing, the analysis results of the thermal resistance model M2 is shown by round marks, and the analysis results of the detail model is shown by triangle marks. As shown in FIG. 15, it can be seen that the analysis results of the thermal resistance model M2 is of a substantially same accuracy as the analysis results of the detail model.

The present embodiment described an example connecting the thermal capacity Chs to the intermediate node Nhs, however the thermal capacity may be connected to either one of the inside node Nti and the outside node Nto, other than the intermediate node Nhs. Even in such case, by setting the value of the thermal capacity by using the analysis result of the detail model of the resistor 8 or the actually measured result as described in FIG. 14, it is possible to accomplish the analysis accuracy as shown in FIG. 15.

As described above, according to the second embodiment, the thermal resistance model M2 further includes the thermal capacity Chs that is connected to the intermediate node Nhs, as a thermal capacity of the intermediate portion 80. This thus allows for analyzing the temperature of the resistor 8 in the transient state while taking in consideration the effect by the substrate 9 with good accuracy.

Third Embodiment

Figure 16A:
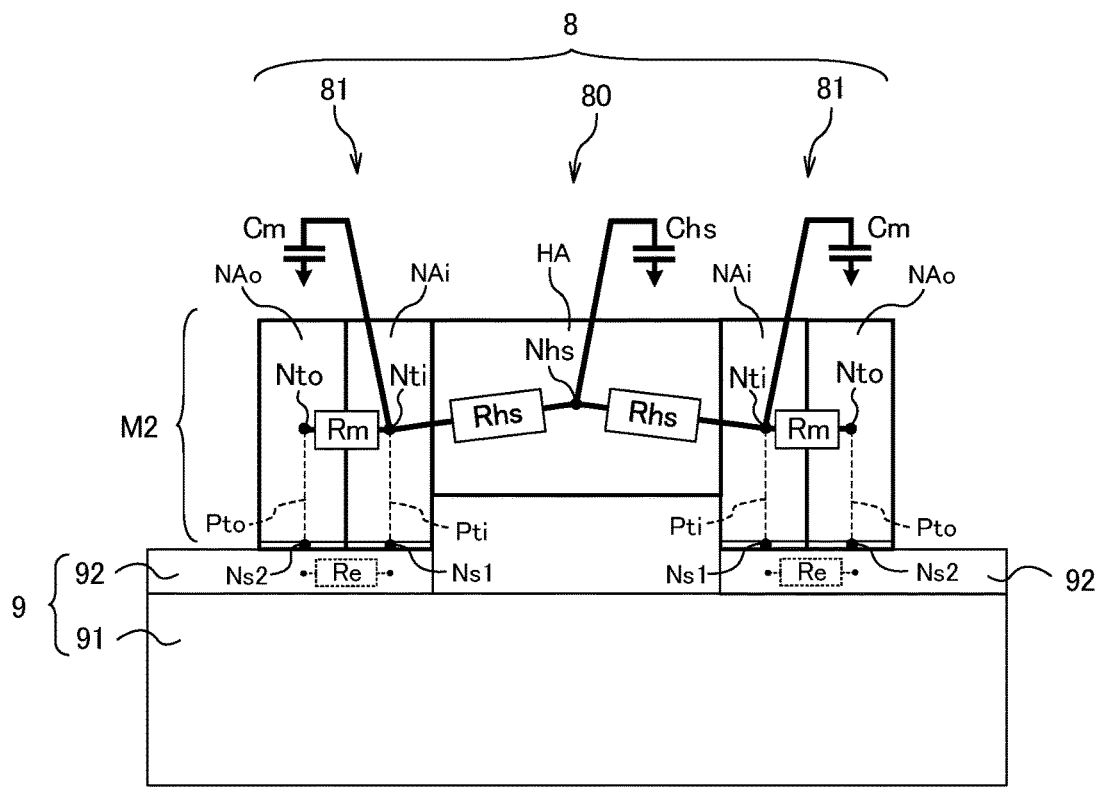
FIG. 16A is a view showing a basic configuration of a thermal analysis model of the resistor in a third embodiment.
Figure 16B:
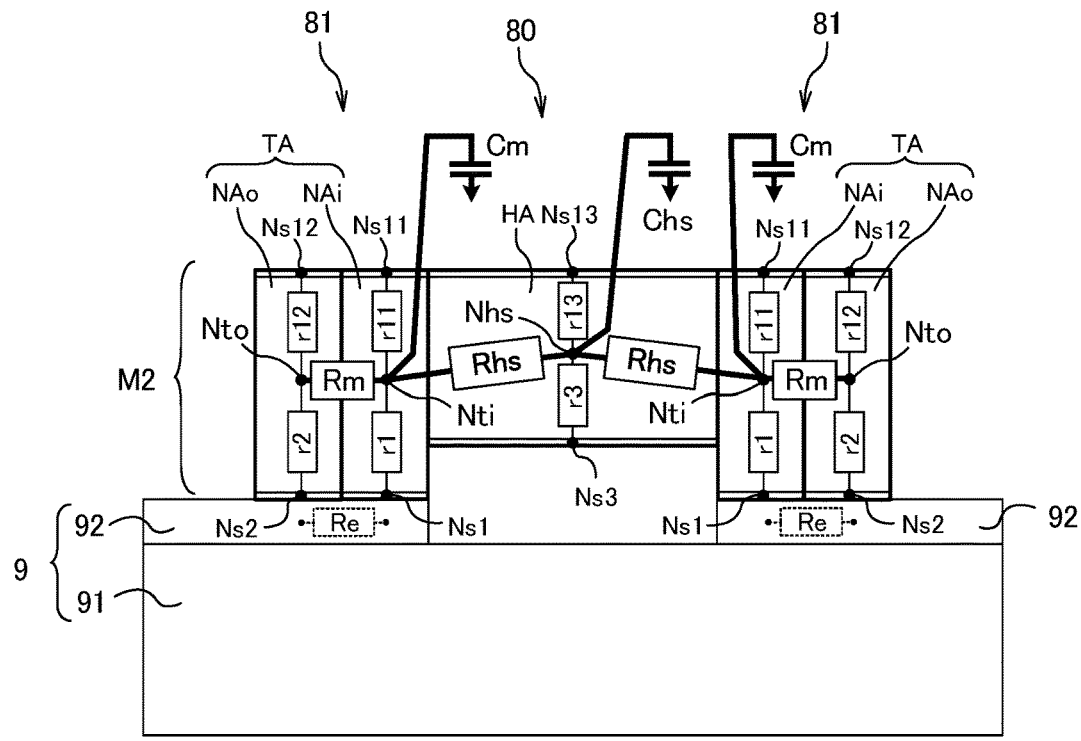
FIG. 16B is a view showing an application example of the thermal analysis model in the present embodiment.

FIG. 16A is a view showing a configuration of the thermal resistance model M2 of the resistor 8 in a third embodiment. FIG. 16B is a view showing an example of applying the thermal resistance model M2 shown in FIG. 16A to the specific software.

The configuration of the thermal resistance model M2 in the present embodiment includes, in addition to the basic configuration of the thermal resistance model M2 shown in FIG. 13A, two thermal capacities Cm that imitate the thermal capacities of the terminal portions 81 on both sides. The thermal capacities Cm are connected to the inside node Nti in each terminal portion area TA. Values of the thermal capacities Cm are set in advance on the basis of a thermal physical property value such as proportional heat and density of the resistive element 8a and the electrode material 8b that configure the terminal portions 81 and shapes of the resistive element 8a and the electrode material 8b.

By adding the thermal capacities Cm to the thermal resistance model M2, it becomes possible to analyze the elapse of time of the temperature of the resistor 8 with good accuracy. In particular, in an environment in which heat is applied to the entire resistor 8 from the outside, the increase in the thermal capacity of the terminal portion 81 facilitates the fluctuation in temperature rising rate of each part in the resistor 8; this thus allows for enhancing the analysis accuracy of the temperatures in each part of the resistor 8.

For example, in a case of applying solder between the electrode material 8b of the resistor 8 and the electrode layer 92 of the substrate 9 and carrying the substrate 9 into a reflow oven of a high temperature in that state in order to solder the resistor 8 onto the electrode layer 92, the temperature analysis of the joining surface 81a on which the solder is applied is of importance. Therefore, by using the thermal resistance model M2 of the present embodiment, it is possible to analyze the temperature of the solder in the reflow oven with good accuracy.

In a case of analyzing the temperature state of the solder within the reflow oven, first, the setting unit 11, upon an input from the analyst, sets a predefined amount of generated heat to each of the outer plane nodes Ns3, Ns11, Ns12 and Ns13 of the resistor 8. Together with this, the setting unit 11 sets the amount of heat from the electrode layer 92 to the joining plane 81a in the area of the detail model M1 that imitates the substrate 9. This takes into account in the thermal resistance model M2 the amount of heat applied on the resistor 8 from around the resistor 8 within the reflow oven.

The analysis unit 13 then executes the temperature analysis of the joining plane nodes Ns1 and Ns2 by using the thermal resistance model M2 of the present embodiment. Accordingly, the analyst can recognize correctly whether or not the solder applied on the joining plane 81a of the resistor 8 increases to a specific temperature that is necessary for the soldering within the reflow oven.

As described above, according to the third embodiment, the thermal resistance model M2 further includes the thermal capacities Cm connected to the inside nodes Nti as the thermal capacities of the terminal portions 81. This takes into account the thermal capacity of the terminal portions 81 in the heat transfer from the intermediate portion 80 to the substrate 9 by the setting unit 11 setting the applied power P to the resistor 8 as the intermediate node Nhs, and hence is possible to enhance the analysis accuracy of the temperature change at the hot spot compared to the second embodiment.

In addition to this, by setting the thermal capacities Cm to the inside nodes Nti of the thermal resistance model M2, it becomes possible to analyze the temperature change of the resistor 8 in a state in which heat of the resistor 8 is applied from the outside with good accuracy.

More specifically, by setting the amount of heat transferred to each part of the resistor 8 from outside to the areas imitating the substrate 9 and to the outer side nodes Ns3, Ns11, Ns12 and Ns13, it is also possible to correctly analyze the solder temperature between the resistor 8 and the substrate 9 within the reflow oven for example. Moreover, analysis in good accuracy becomes possible also for the temperature change of the resistor 8 at a situation in which heat is transferred from electronic components such as semiconductor circuits having higher amounts of generated heat than the resistor 8 via the substrate 9.

The above describes the embodiments of the present disclosure, however the embodiments described above merely show one part of an application example of the present disclosure, and is not intended to limit the technical scope of the present disclosure to the specific configurations in the embodiments described above.

For example, the embodiments described above showed an example that mounts the resistor 8 on a substrate 9 on which the electrode layer 92 is stacked on a surface of an insulation substrate 91, however the effect as with the present embodiment is obtainable even in a case of mounting the resistor 8 on a substrate whose electrode layer 92 is formed inside the insulation substrate 91.

Moreover, the embodiment described above described an example in which the value of the second thermal resistance Rm is determined in advance, however it is not limited to this. For example, after the analysis model generation unit 12 generates the thermal resistance model M2 on the basis of the thermal network data, the setting unit 11 may change the value of the second thermal resistance Rm in response to the thickness of the electrode layer 92 upon an input by the analyst. Alternatively, the value of the second thermal resistance Rm may be changed by preparing a thermal resistance table showing a relationship between the thickness of the electrode layer 92 and the value of the second thermal resistance Rm and setting the thickness of the electrode layer 92 in a predefined column of the thermal resistance model M2.

Moreover, although the embodiments described above described an example using the detail model that applies the finite element method as the thermal analysis method of the substrate 9 and the electronic components other than the resistor 8, for example an analysis model applying the finite difference method or the finite volume method, or a DELPHI model imitating with six or more thermal resistances may be used.

Moreover, in the embodiments described above, the terminal portions 81 were configured of the resistive element 8*a* and the electrode material 8*b*, however a resistor in which the terminal portions 81 are configured only of the electrode material 8*b* may be subjected to analysis. In this case, the resistive element 8*a* is sandwiched between opposing planes of a pair of the electrode materials 8*b*, and the entire resistive element 8*a* will configure the intermediate portion 80. Even in this case, the effects as with the embodiments described above is obtainable.

Moreover, in the embodiments described above, the areas HA, TAi and TAo that belong to the nodes Nhs, Nti and Nto are set to the thermal resistance model M2 to fit the dimensions of the resistor 8, so that the analyst can easily generate the analysis model of the electronic circuit. However, the areas HA, TAi and TAo may be omitted, and just the values of the first thermal resistance Rhs and second thermal resistance Rm and their positional relationship may be set in the thermal resistance model M2.

The present application claims priority on the basis of JP2018-047791 filed with the Japanese Patent Office on Mar. 15, 2018, and the entire details of this application shall be incorporated by reference in the present specification.

The invention claimed is:

1. A computer program product comprising a non-transitory, machine-readable medium storing instructions which, when executed by at least one programmable processor, causes at least one programmable processor to perform operations to perform a thermal fluid analysis process and to analyze a temperature of a resistor, the resistor having an intermediate portion and a pair of terminal portions on opposing sides of the intermediate portion, the intermediate portion spaced apart from a substrate and the pair of terminal portions mounted onto the substrate on both sides of the intermediate the at least one programmable processor executing the steps of:
   preparing a thermal analysis model including an intermediate node configured to imitate the intermediate portion of the resistor, and a first thermal resistance connecting to the intermediate node;
   setting a predefined value as an amount of heat generated at the intermediate node; and
   analyzing a temperature of the resistor by using the thermal analysis model, wherein in the thermal analysis model,
      at least one of the terminal portions on the both sides is imitated by:
      a terminal portion inside node connecting to the first thermal resistance, the first thermal resistance being a set value, the terminal portion inside node being configured to imitate an inside area in the one of the terminal portions, the inside area being adjacent to the intermediate portion, and the terminal portion inside node being configured to serve as a starting point of a first heat dissipation path from the one of the terminal portions to the substrate;
      a terminal portion outside node configured to imitate an outside area separated from the intermediate portion and adjacent to the inside area in the one of the terminal portions, the terminal portion outside node being configured to serve as a starting point of a second heat dissipation path from the one of the terminal portions to the substrate; and
      a second thermal resistance connecting the terminal portion inside node and the terminal portion outside node, the second thermal resistance being arranged parallel to a different element configured to imitate a thermal resistance of an electrode layer in a surface of the substrate, and wherein heat along the first heat dissipation path and the second dissipation path is calculated by processing the thermal resistance of the electrode layer in the surface of the substrate, and the first heat dissipation path and the second heat dissipation path are parallel to each other.

2. The computer program product according to claim 1, further comprising a heat capacity connecting with respect to the intermediate node.

3. The computer program product according to claim 2, further comprising a heat capacity connecting with respect to the terminal portion inside node.

4. The computer program product according to claim 1, wherein the terminal portion inside node is a node configured to imitate a center portion of a side plane of a resistive element part included in the one of the terminal portions, and
   the side plane of the resistive element part is a plane parallel to a vertical direction with respect to the substrate and a direction extending between the terminal portions on the both sides.

5. The computer program product according to claim 4, wherein a value of the second thermal resistance is determined on the basis of a difference between a temperature occurring at the center portion by power applied on the resistor and a temperature occurring on the outside end of the outside area.

6. The computer program product according to claim 1, wherein the terminal portion outside node is a node configured to imitate an outside end of the outside area.

7. The computer program product according to claim 1, wherein each of the first thermal resistance and the second thermal resistance has at least one end thereof connecting to an outer plane node configured to imitate an outer plane of an area corresponding to the one end in the resistor.

8. The computer program product according to claim 7, wherein the outer plane node is a node configured to imitate an outer plane of the intermediate portion opposing the substrate.

9. The computer program product according to claim 1, wherein the other of the terminal portions on the both sides is also imitated by the same configuration as the at least one of the terminal portions on the both sides.

10. The computer program product according to claim 1, wherein each of the first thermal resistance and the second thermal resistance is configured of one or a plurality of thermal resistances.

11. The computer program product as set forth in claim 1, wherein a value of the second thermal resistance is determined by processing a difference between a temperature occurring at a center portion on a side plane of a resistive element included in the terminal portions by an applied power to the resistor and a temperature occurring on an outside end of the outside area.

12. A thermal analysis device configured to analyze a temperature of a resistor, the resistor being provided with an intermediate portion separated from a substrate and terminal portions connecting to the substrate on both sides of the intermediate portion, the thermal analysis device including a processor configured to:
    prepare a thermal analysis model including an intermediate node configured to imitate the intermediate portion of the resistor and a first thermal resistance connecting to the intermediate node;
    set a predefined value as an amount of heat generated at the intermediate node; and
    analyze a temperature of the resistor by using the thermal analysis model, wherein in the thermal analysis model, at least one of the terminal portions on the both sides is imitated by:
        a terminal portion inside node connecting to the first thermal resistance, the first thermal resistance being a set value, the terminal portion inside node being configured to imitate an inside area in the one of the terminal portions, the inside area being adjacent to the intermediate portion, and the terminal portion inside node being configured to serve as a starting point of a first heat dissipation path from the one of the terminal portions to the substrate;
        a terminal portion outside node configured to imitate an outside area separated from the intermediate portion and adjacent to the inside area in the one of the terminal portions, the terminal portion outside node configured to serve as a starting point of a second heat dissipation path from the one of the terminal portions to the substrate; and
        a second thermal resistance connecting the terminal portion inside node and the terminal portion outside node, the second thermal resistance being arranged parallel along the substrate surface to a different element configured to imitate a thermal resistance of an electrode layer in a surface of the substrate and wherein heat along the first heat dissipation path and the second dissipation path is calculated by processing the thermal resistance of the electrode layer in the surface of the substrate, and the first heat dissipation path and the second heat dissipation path are parallel to each other.

13. The thermal analysis device as set forth in claim 12, wherein a value of the second thermal resistance is determined by processing a difference between a temperature occurring at a center portion on a side plane of a resistive element included in the terminal portions by an applied power to the resistor and a temperature occurring on an outside end of the outside area.

14. A computer program product comprising a non-transitory, machine-readable medium storing instructions which, when executed by at least one programmable processor, causes at least one programmable processor to perform operations to perform a thermal fluid analysis process and to generate a thermal analysis model of a resistor provided with an intermediate portion separated from the substrate and terminal portions connecting to the substrate on both sides of the intermediate portion to execute the following steps of:
    setting an intermediate node configured to imitate the intermediate portion;
    setting a first thermal resistance connecting to the intermediate node, and imitating at least one of the terminal portions on the both sides, wherein the step of imitating the at least one of the terminal portions comprises the following steps of:
        setting a terminal inside node connecting to the first thermal resistance, the first thermal resistance being a set value, the terminal inside node being configured to imitate an inside area in the one of the terminal portions, the inside area being adjacent to the intermediate portion, and the terminal inside node being configured to serve as a starting point of a first heat dissipation path from the one terminal portion to the substrate;
        setting a terminal portion outside node configured to imitate an outside area separated from the intermediate portion and adjacent to the inside area in the one terminal portion, the terminal portion outside node being configured to serve as a starting point of a second heat dissipation path from the one terminal portion to the substrate; and
        setting a second thermal resistance connecting the terminal portion inside node and the terminal portion outside node, the second thermal resistance being arranged parallel along the substrate surface to a different element configured to imitate a thermal resistance of an electrode layer of a surface of the substrate, and wherein heat along the first heat dissipation path and the second dissipation path is calculated by processing the thermal resistance of the electrode layer in the surface of the substrate, and the first heat dissipation path and the second heat dissipation path are parallel to each other.

15. The computer program product as set forth in claim 14, wherein a value of the second thermal resistance is determined by processing a difference between a temperature occurring at a center portion on a side plane of a resistive element included in the terminal portions by an applied power to the resistor and a temperature occurring on an outside end of the outside area.

* * * * *